US011915837B2

United States Patent
Graves et al.

(10) Patent No.: US 11,915,837 B2
(45) Date of Patent: Feb. 27, 2024

(54) ELECTRON DIFFRACTION INTENSITY FROM SINGLE CRYSTAL SILICON IN A PHOTOINJECTOR

(71) Applicant: Arizona Board of Regents on Behalf Of Arizona State University, Scottsdale, AZ (US)

(72) Inventors: William Graves, Tempe, AZ (US); Lucas Malin, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 354 days.

(21) Appl. No.: 17/378,094

(22) Filed: Jul. 16, 2021

(65) Prior Publication Data
US 2021/0341399 A1  Nov. 4, 2021

Related U.S. Application Data

(63) Continuation of application No. PCT/US2020/014188, filed on Jan. 17, 2020.
(Continued)

(51) Int. Cl.
*G21K 1/06* (2006.01)
*H01S 4/00* (2006.01)
(Continued)

(52) U.S. Cl.
CPC ....... *G21K 1/062* (2013.01); *G01N 23/20008* (2013.01); *H01S 4/00* (2013.01);
(Continued)

(58) Field of Classification Search
CPC .......... G21K 1/062; H01S 4/00; H05G 2/008; G01N 2223/0565; G01N 2223/102;
(Continued)

(56) References Cited

U.S. PATENT DOCUMENTS

| 2012/0312987 A1 | 12/2012 | Tokita et al. |
| 2016/0307659 A1* | 10/2016 | Nanni ................ H05G 2/00 |
| 2021/0343444 A1 | 11/2021 | Graves |

FOREIGN PATENT DOCUMENTS

| JP | H06-341868 A | 12/1994 |
| JP | 2018-040613 A | 3/2018 |
| WO | WO2017196434 A1 | 11/2017 |

OTHER PUBLICATIONS

Bonifacio et al., "Collective instabilities and high-gain regime free electron laser", AIP Conference Proceedings, 118, 236, Published Online: Jun. 5, 2008, 25 pgs. https://doi.org/10.1063/134640.
(Continued)

*Primary Examiner* — David E Smith
(74) *Attorney, Agent, or Firm* — Morgan, Lewis & Bockius LLP

(57) ABSTRACT

A method includes simulating diffraction in a transmission geometry of relativistic electron bunches from a crystallographic structure of a crystal thereby simulating diffraction of the relativistic electron bunches into a plurality of Bragg peaks. The method includes selecting a range of angles between a direction of propagation of the relativistic electron bunches and a normal direction of crystal including an angle at which a diffraction portion is maximized. The method includes sequentially accelerating a plurality of physical electron bunches to relativistic energies toward a physical crystal having the crystallographic structure and diffracting the plurality of physical electron bunches off the physical crystal at different angles and measuring the diffraction portion into the respective Bragg peak at the different angles. The method includes selecting a final angle based on the measured diffraction portion into the respective Bragg peak at the different angles and generating a pulse of light.

8 Claims, 19 Drawing Sheets

Related U.S. Application Data

(60) Provisional application No. 62/794,467, filed on Jan. 18, 2019, provisional application No. 62/794,468, filed on Jan. 18, 2019.

(51) Int. Cl.
    *H05G 2/00*         (2006.01)
    *G01N 23/20008*   (2018.01)

(52) U.S. Cl.
    CPC ..... *H05G 2/008* (2013.01); *G01N 2223/0565* (2013.01); *G01N 2223/102* (2013.01); *G21K 2201/061* (2013.01); *G21K 2201/067* (2013.01)

(58) Field of Classification Search
    CPC ....... G01N 2223/061; G01N 2223/063; G01N 2223/067
    See application file for complete search history.

(56) References Cited

OTHER PUBLICATIONS

Cowley et al., "The Scattering of Electrons by Atoms and Crystals. I. A New Theoretical Approach", Acta Cryst. (1957). 10, 609, Chemical Physics Section, Division of Industrial Chemistry, C.S.I.R.O., Melbourne, Australia, 11 pgs.

Egerton, "Electron energy-loss spectroscopy in the TEM", Physics Department, University of Alberta, T6G 2G7 Canada, Published Dec. 16, 2008, 26 pgs. Stacks.iop.org/RoPP/72/016502.

Geloni et al., "Cost-effective way to enhance the capabilities of the LCLS baseline", European XFEL GmbH, Hamburg, Germany, Deutsches Elektronen-Synchrotron (DESY), Hamburg, Germany, Aug. 18, 2010, 42 pgs.

Geloni et al., "Cascade self-seeding scheme with wake monochromator for narrow-bandwidth X-ray FELs", European XFEL GmbH, Hamburg, Germany, Deutsches Elektronen-Synchrotron (DESY), Hamburg, Germany, Jun. 10, 2010, 39 pgs.

Graves et al., "Intense Superradiant X Rays from a Compact Source Using a Nanocathode Array and Emittance Exchange", Physical Review Letters, PRL 108, 263904 (2012), Massachusetts Institute of Technology, Cambridge, Massachusetts 02139, Center for Free-Electron Laser Science, Deutsches Elektronen-Synchrotron, 22607 Hamburg, Germany; Department of Physics, Northern Illinois University, DeKalb, Illinois 60115, Fermi National Accelerator Laboratory, Batavia, Illinois 60510, published Jun. 26, 2012), 5 pgs.

Graves et al., "Compact x-ray source based on burst-mode inverse Compton scattering at 100 kHz", Physical Review Special Topics—Accelerators and Beams 17, 120701 (2014), Massachusetts Institute of Technology, Cambridge, Massachusetts 02139; MIT-Bates Laboratory, Middleton, Massachusetts 02139; CFEL, 22761 Hamburg, Germany; SLAC, 2575 Sand Hill Road, Menlo Park, California 94025; published Dec. 1, 2014, 24 pgs.

Graves et al., "Nanopatterned electron beams for temporal coherence and deterministic phase control of x-ray free-electron lasers", Arizona State University, Tempe, Arizona 85287; SLAC National Accelerator Laboratory, Menlo Park, CA 94025; Department of Physics, University of Arizona, Tucson, Arizona 85721, Nov. 15, 2021, 6 pgs.

Humphreys, "The Scattering of fast electrons by crystals", Reports on Progress in Physics, vol. 42, 1825, Department of Metallurgy and Science of Materials, University of Oxford, Oxford OX1 3PH and Jesus College, Oxford, 73 pgs.

Ishizuka et al., "A New Theoretical and Practical Approach to the Multislice Method", Acta Cryst. (1977). A33, 740-749, Institute for Chemical Research, Kyoto University, Uji, Kyoto-Fu 611, Japan, accepted Apr. 8, 1977, 11 pgs.

JEMS-SAAS, Dr. P. Stadelmann, Obere Lomattenstrasse 33, CH-3906 Saas-Fee, Switzerland; 2 pgs. The Wayback Machine—https://web.archive.org/web/20181211054140/htyp://www.JEMS-SAAS.ch:80/.

Murooka et al., "Transmission-electron diffraction by MeV electron pulses", Applied Physics Letters 98, 251903 (2011), The institute of Scientific and Industrial Research, Osaka University, Mihogaoka 8-1, Ibaraki, Osaka 665-0047, Japan, accept Jun. 2, 2011; published online Jun. 20, 2011; corrected Nov. 9, 2011, 4 pgs. https://doi.org/10.1063/1.3602314.

Nanni et al., "Aberration corrected emittance exchange", Physical Review Special Topics—Accelerators and Beams 18, 084401 (2015), Massachusetts Institute of Technology, Cambridge, Massachusetts 02139, USA, published Aug. 24, 2015, 10 pgs. DOI: 10.1103/PhysRevSTAB.18.084401.

Nanni et al., "Nanomodulated electron beams via electron diffraction and emittance exchange for coherent x-ray generation", Physical Review Accelerators and Beams 21, 014401 (2018), SLAC National Accelerator Laboratory, Menlo Park, California 94025; Massachusetts Institute of Technology, Cambridge, Massachusetts 02139; Arizona State University, Tempe, Arizona 85287, published Jan. 19, 2018, 11 pgs.

Radi, "Complex lattice potentials in electron diffraction calculated for a number of crystals." Acta Crystallographica Section A: Crystal Physics, Diffraction, Theoretical and General Crystallography 26, No. 1 (1970): 41-56, 16 pgs.

Schwinger, "On Radiation by Electrons in a Betatron", (1945), Transcribed by M. A. Furman, Accelerator and Fusion Research Division, Lawrence Berkeley National Laboratory Berkeley, CA 94720, Jul. 29, 1996, 29 pgs.

Schwinger, "On the Classical Radiation of Accelerated Electrons", Physical Review, vol. 75, No. 12, Jun. 15, 1949, Harvard University, Cambridge, Massachusetts, 14 pgs.

Sears et al., "Debye-Waller factor for elemental crystals", AECL, Chalk River Laboratories, Chalk River, Ontario K0J 1J0, Canada, Acta Cryst. (1991). A47, 441-446, Accepted Mar. 6, 1991, 6 pgs. https://doi.org/10.1107/S0108767391002970.

Shen et al., "Femtosecond mega-electron-volt electron microdiffraction", ScienceDirect, Ultramicroscopy 184 (2018) 172-176, SLAC National Accelerator Laboratory, 2575 Sand Hill Road, Menlo Park, CA 94025, 0304-3991/Published by Elsevier B.V., Revised Jul. 27, 2017, Accepted Aug. 29, 2017, Available online Sep. 1, 2017, 5 pgs. http://dx.doi.org/10.1016/j.ultramic.2017.08.019.

Spence et al., "Stem microanalysis by transmission electron energy loss spectroscopy in crystals", Ultramicroscopy, 9 (1982) 267-276, North-Holland Publishing Company, Department of Physics, Arizona State University, Temple, Arizona 85287, (presented at Workshop Jan. 1982), 10 pgs. https://doi.org/10.1016/0304-3991(82)90211-X.

Weathersby et al., "Mega-electron-volt ultrafast electron diffraction at SLAC national accelerator laboratory", Cited as: Review of Scientific Instruments, 86, 073702 (2015); Submitted: May 9, 2015; Accepted: Jul. 6, 2015; Published Online: Jul. 24, 2015, 10 pgs. https://doi.org/10.1063/1.4926994.

European Patent Office, Supplemental European Search Report and Opinion for application No. 20742134.8, dated Feb. 23, 2022, 9 pages.

Gomez-Rodriguez, A., et al., "SimulaTEM: Multislice simulations for general objects", *Ultramicroscopy*, Elsevier B.V., Amsterdam, NL; Jan. 1, 2010; vol. 110(2):95-104; XP026821912, ISSN: 0304-3991 [retrieved on Sep. 30, 2009].

Muro'oka, Y., et al., "Transmission-electron diffraction by MeV electron pulses", *Applied Physics Letters*, American Institute of Physics, Melville, NY; Jun. 20, 2011; vol. 98(25):251903-1-251903-3; XP012141135, ISSN: 0003-6951, DOI: 10.1063/1.3602314.

Nanni, E., et al: "Nano-modulated electron beams via electron diffraction and emittance exchange for coherent x-ray generation", Jun. 23, 2015, arxiv.org, Cornell University Library, Ithaca, NY:1-5, XP081364015 [available at https://arxiv.org/abs/1506.07053v1].

Arizona Board of Regents on Behalf of Arizona State University, EP20740878, Supplemental European Search Report, dated Nov. 21, 2021, 8 pages.

(56) References Cited

OTHER PUBLICATIONS

Arizona Board of Regents on Behalf of Arizona State University, PCT/US2020/014188, International Search Report and Written Opinion, dated Mar. 25, 2020, 9 pgs.
Arizona Board of Regents on Behalf of Arizona State University, PCT/US2020/014188, International Preliminary Report on Patentability, dated Jun. 16, 2021, 5 pgs.
Arizona Board of Regents on Behalf of Arizona State University, PCT/US2020/014189, International Search Report and Written Opinion, dated Mar. 30, 2020, 10 pgs.
Arizona Board of Regents on Behalf of Arizona State University, PCT/US2020/014189, International Preliminary Report on Patentability, dated Jun. 16, 2021, 6 pgs.
Arizona Board of Regents on Behalf of Arizona State University, JP2021-541050, Notice of Reasons for Rejection, dated Nov. 22, 2023, 15 pgs.

* cited by examiner

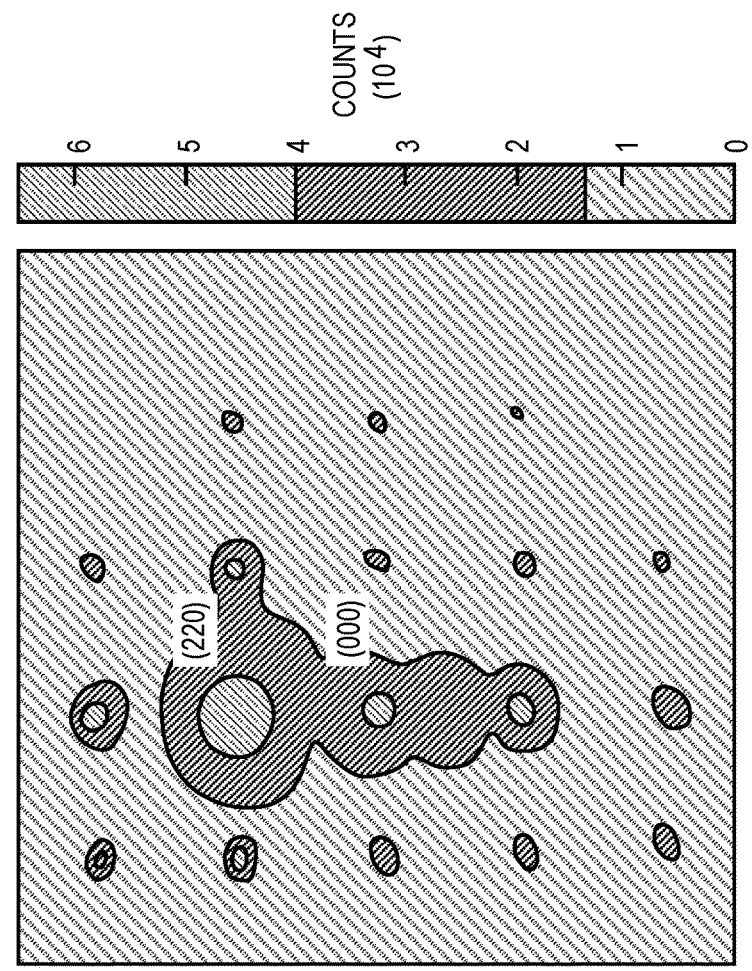
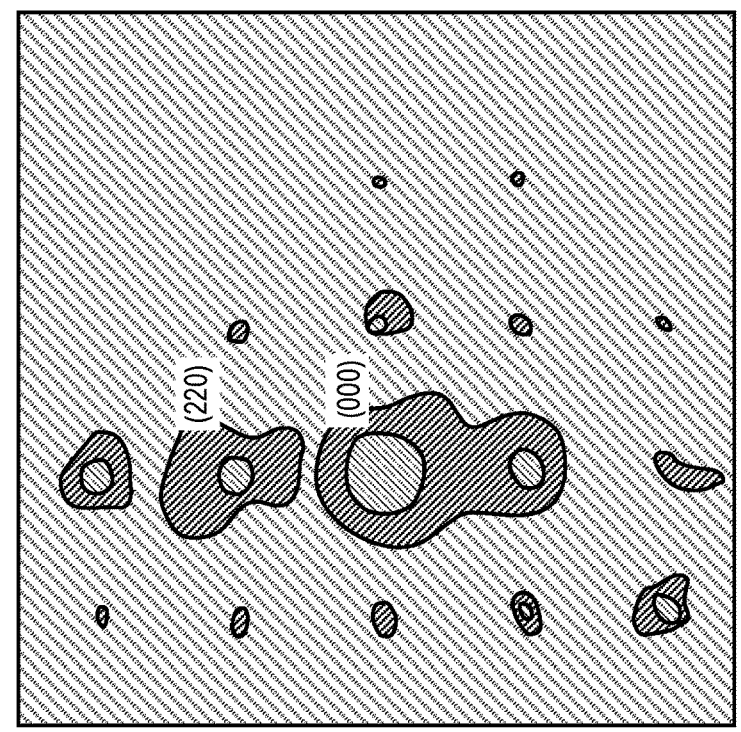
FIG. 3B
FIG. 3A

600

604 Partition the electron bunch by transmitting the electron bunch through a grating at the relativistic energy.

> 614 The alternating narrow portions and wide portions of the grating are patterned such that the pulse of light is chirped.

> 616 Transmitting the electron bunch through the grating at the relativistic energy diffracts the electron bunch off a crystal structure of the grating, thereby creating a diffraction pattern having a plurality of crystallographic peaks. The plurality of crystallographic peaks are spatially separated because of the plurality of alternating narrow portions and wide portions.

> 618 Select, using an aperture, electrons in a respective crystallographic peak of the plurality of crystallographic peaks to use as the partitioned electron bunch and discard the remaining electrons.

> 620 Transmitting the electron bunch through the grating at the relativistic energy partitions the electron bunch in a direction substantially transverse to the direction of propagation of the electron bunch.

> 622 The pulse of light is generated with the electron bunch partitioned in a direction substantially parallel to the direction of propagation of the electron bunch.

> 624 Prior to generating the pulse of light using the partitioned electron bunch, perform an emittance exchange on the partitioned electron bunch.

FIG. 6B

612 Generate a pulse of light using the partitioned electron bunch

626 The electron bunch is a first electron having first electronic characteristics and the pulse of light is a first pulse of light having first optical characteristics.

628 Accelerate a second electron bunch having second electronic characteristics different from the first electronic characteristics and partition the second electron bunch by transmitting the second electron bunch through the grating and generate a second pulse of light using the partitioned second electron bunch. The second pulse of light has second optical characteristics different from the first optical characteristics.

630 The first electronic characteristics include a first spot size, the second electronic characteristics include a second spot size different from the first spot size.

632 The first optical characteristics include a first bandwidth and the second optical characteristics include a second bandwidth different from the first bandwidth.

FIG. 6C

612 Generate a pulse of light using the partitioned electron bunch

634 Generating the pulse of light using the partitioning electron bunch comprises scattering the partitioned electron bunch off of light from a laser.

636 Generating the pulse of light using the partitioned electron bunch comprises subjecting the partitioned electron bunch to an undulator.

638 The pulse of light is within 10 % of a transform limit.

640 The pulse of light is longitudinally coherent across a plurality of wavelengths of the pulse of light.

642 The pulse of light is generated at a first light source that includes the grating.

644 Use the pulse of light to seed a second light source, distinct from the first light source, to produce coherent light.

646 The pulse of light comprises x-rays.

1114 Generate a pulse of light including accelerating a subsequent physical electron bunch to a relativistic energy, diffracting the subsequent physical electron bunch off the physical crystal at final angle, and generating the pulse of light using the diffracted subsequent physical electron bunch.

1116 Diffracting the subsequent physical electron bunch off the physical crystal at the final angle partitions the subsequent physical electron bunch in a direction substantially transverse to the direction of propagation of the subsequent physical electron bunch.

1118 The pulse of light is generated with the subsequent physical electron bunch partitioned in a direction substantially parallel to the direction of propagation of the subsequent physical electron bunch.

1120 Prior to generating the pulse of light using the partitioned subsequent physical electron bunch, perform an emittance exchange on the partitioned subsequent physical electron bunch.

1122 Generating the pulse of light using the partitioned electron bunch comprises scattering the partitioned electron bunch off of light from a laser.

1124 Generating the pulse of light using the partitioned electron bunch comprises subjecting the partitioned electron bunch to an undulator.

1126 The pulse of light comprises x-rays.

1102 Simulate diffraction in a transmission geometry of relativistic electron bunches from a crystallographic structure of a crystal, thereby simulating diffraction of the relativistic electron bunches into a plurality of Bragg peaks.

1128 The simulation of the diffraction in the transmission geometry is performed using a multi-slice method.

1126 The crystal is a silicon crystal.

1128 The crystallographic structure is a Si(100) crystallographic structure.

FIG. 11C

ELECTRON DIFFRACTION INTENSITY FROM SINGLE CRYSTAL SILICON IN A PHOTOINJECTOR

CROSS-REFERENCE TO RELATED APPLICATIONS

This application is a continuation of PCT/US20/14188, filed Jan. 17, 2020, which claims the benefit of, and priority to, U.S. Provisional Applications No. 62/794,467, filed Jan. 18, 2019 and No. 62/794,468, filed Jan. 18, 2019, each of which is incorporated herein by reference in its entirety.

GOVERNMENT SUPPORT

This invention was made with government support under 1632780 and 1231306 awarded by National Science Foundation and DE-AC02-76SF00515 awarded by the Department of Energy. The government has certain rights in the invention.

TECHNICAL FIELD

The present invention relates to free-electron lasers (FELs), and in particular to X-ray free-electron lasers (XFELs).

BACKGROUND

An x-ray free-electron laser (XFEL) produces x-ray pulses with durations shorter than 100 femtoseconds (fs) each containing enough photons to produce a diffraction pattern from a nanocrystal in a single shot, while outrunning most effects of radiation damage. XFELs are proving to be powerful tools across a range of applications including crystal structure and dynamics of biological molecules in their native environment, fundamental charge and energy dynamics in molecules, emergent phenomena in correlated electron systems, single-particle structures and dynamics, and matter in extreme environments. The shortest XFEL pulses approach 1 fs corresponding to a natural time scale of the fastest electronic excitations and are opening a new era in exploration of dynamics at an atomic scale.

Fully coherent x-ray pulses with tailored spectral and temporal properties would open new opportunities in x-ray science. In chemical and biological systems, charge migration and energy redistribution dynamics involve coherent reaction pathways and coupled electronic and nuclear motions spanning from attosecond (as) to picosecond (ps) timescales. In order to map such dynamics using pump-probe schemes, it is essential to have temporally coherent x-ray pulses. In particular, multi-dimensional non-linear x-ray spectroscopy of quantum coherence in molecular systems and correlated materials requires an application of a precisely controlled sequence of x-ray pulses with a full spatial and temporal control of phase fronts.

Currently operational XFELs, however, exhibit full spatial coherence but only partial temporal coherence. There is no coherent seed radiation for XFEL photon energies above a few hundred electron volts (eV). Therefore, XFELs use self-amplification of spontaneous emission (SASE) to amplify incoherent radiation that is emitted in initial sections of a long magnetic undulator. Such incoherent radiation has well known shot-noise properties resulting in amplified output that is chaotic in nature and includes random phase jumps that produce a spiky single-shot power spectrum with large shot-to-shot intensity fluctuations. Problems arising from such incoherent radiation could be overcome by a coherent seed that could be amplified. A variety of seeding techniques have been implemented but are limited by either the low photon energy of the seed or, in the case of self-seeding, from effects of the original shot noise fluctuations.

Accordingly, there is a need for improved methods and assemblies for providing temporally coherent x-ray pulses.

SUMMARY

In accordance with some embodiments, a method includes accelerating an electron bunch along a direction of propagation to a relativistic energy and partitioning the electron bunch by transmitting the electron bunch through a grating at the relativistic energy. The grating includes a plurality of alternating narrow portions and wide portions. The narrow portions have a first thickness in a direction substantially parallel to the direction of propagation of the electron bunch, and the wide portions have a second thickness in the direction substantially parallel to the direction of propagation of the electron bunch. The second thickness is greater than the first thickness. The method also includes generating a pulse of light using the partitioned electron bunch.

Further, in accordance with some embodiments, a light source includes an electron photoinjector for producing an electron bunch. The light source further includes a first linear accelerator section for accelerating the electron bunch to a relativistic energy. The light source further includes a grating, downstream of the first linear accelerator section and arranged such that the electron bunch is transmitted through the grating. The grating comprising a plurality of alternating narrow portions and wide portions. The narrow portions have a first thickness in a direction substantially parallel to a direction of propagation of the electron bunch, and the wide portions have a second thickness in the direction substantially parallel to the direction of propagation of the electron bunch, the second thickness being greater than the first thickness. The light source further includes a light-generating apparatus, downstream of the grating, for generating light from the electron bunch, the light-generating apparatus comprising one or more of the group consisting of: an undulator and an inverse Compton scattering laser.

In accordance with some embodiments, a method includes simulating diffraction in a transmission geometry of relativistic electron bunches from a crystallographic structure of a crystal. The method thereby simulates diffraction of the relativistic electron bunches into a plurality of Bragg peaks. The method includes selecting, based on the simulated diffraction of the relativistic electron bunches from the crystallographic structure, a range of angles between a direction of propagation of the relativistic electron bunches and a normal direction of crystal. The range of angles is selected to include an angle at which a diffraction portion into a respective Bragg peak of the plurality of Bragg peaks is maximized. The method includes sequentially accelerating a plurality of physical electron bunches to relativistic energies. The plurality of physical electron bunches is accelerated toward a physical crystal having the crystallographic structure. The method includes diffracting the plurality of physical electron bunches off the physical crystal at different angles within the range of angles, measuring the diffraction portion into the respective Bragg peak at the different angles within the range of angles, and selecting a final angle based on the measured diffraction portion into the respective Bragg peak at the different angles within the range of angles. The method also includes generating a pulse of light, including accelerating a subsequent physical electron bunch to a relativistic energy, diffracting the subsequent physical electron bunch off the physical crystal at final angle, and generating the pulse of light using the diffracted subsequent physical electron bunch.

BRIEF DESCRIPTION OF THE DRAWINGS

The invention will be more fully understood by referring to the following Detailed Description of Specific Embodiments in conjunction with the not-to scale Drawings, of which:

FIGS. 3A and 3B are exemplary illustrations of experimental results for controlling intensities of different Bragg spots by varying an incident angles of an input electron bunch.

FIGS. 6A-6D collectively provide a flow chart of a method for generating nanopatterned electron bunches, in accordance with some embodiments of the present disclosure.

FIG. 11A-11C collectively provide a flow chart of a method for generating nanopatterned electron bunches, in accordance with some embodiments of the present disclosure.

Figure 1A:
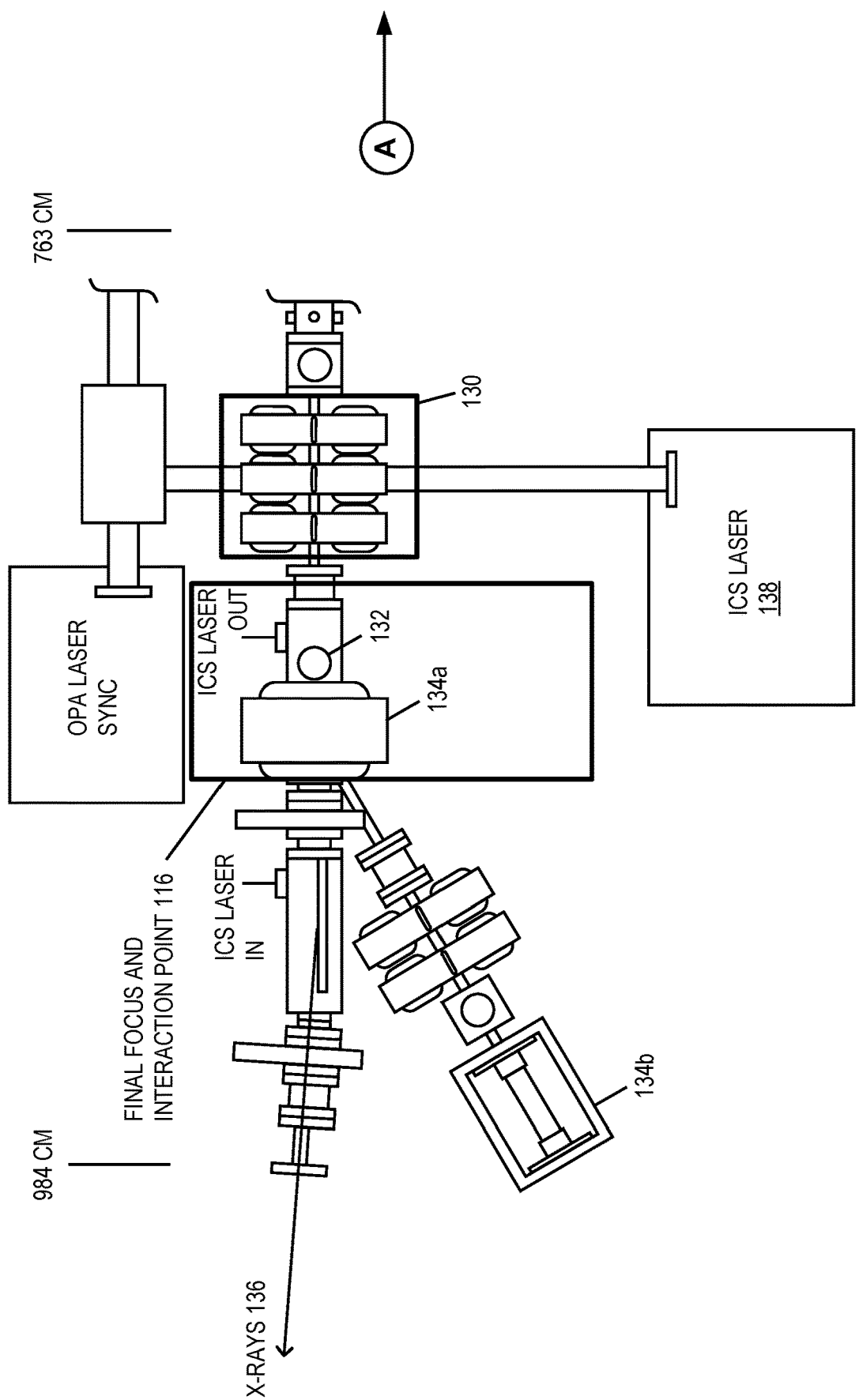
FIGS. 1A-1C are schematic diagrams illustrating a light source (e.g., a free-electron laser) in accordance with some embodiments.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Embodiments of the present disclosure provide methods and assemblies for generating temporally coherent x-ray pulses. As explained above, current XFELs provide only partial temporal coherence. The lack of temporal coherence is due to both the random spacing of the bunched electrons in a SASE process and to the lack of a coherent x-ray seed pulse for amplification. The resulting output radiation of current XFELs has the characteristics of shot noise, random phase jumps, and rapid fluctuations in intensity during the pulse, a wavelength spectrum filled with many distinct lines, and large fluctuations in the spectral characteristics and pulse energy from shot-to-shot.

Instead of seeding with coherent radiation, the methods and assemblies of the present disclosure arrange the electrons into discrete bunches (e.g., nanobunches) with periodicity equal to a desired x-ray wavelength (e.g., in the laboratory frame) so that the electrons then emit coherently at that wavelength (e.g., when subjected to an undulator). Coherent spontaneous emission is then emitted by phased nanobunches amplified by the FEL process for relatively modest electron bunch parameters. Such FEL gain produces a single optical mode that dominates the output resulting in temporally coherent laser-like radiation. The present disclosure thereby overcomes the random electronic spacing inherent in the SASE process by patterning the electron bunch to create bunches with nanometer separation matching the desired x-ray wavelengths.

The electron bunching pattern is deterministically repeatable and may be controlled to produce a wide variety of phase relationships to achieve different experimental properties including a stable transform-limited (or nearly-transform limited) single spike spectrum, frequency chirped x-rays, multiple wavelengths with fixed phase relationships, and/or multiple ultrashort x-ray pulses with precise and tunable time delays ranging from attosecond to femtosecond level. In short, the present methods allow the time-structure for a fully coherent x-ray beam to be generated from a pattern written on a semiconductor wafer (e.g., a single crystal silicon membrane) by lithography.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For example, a reference to an identified direction or vector or line or plane being substantially parallel to a referenced line or plane is to be construed as such a direction or vector or line or plane that is the same as or very close to that of the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). For example, a reference to an identified direction or vector or line or plane being substantially perpendicular to a referenced line or plane is to be construed as such a direction or vector or line or plane the normal to the surface of which lies at or very close to the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree).

Other specific examples of the meaning of the terms "substantially", "about", and/or "approximately" as applied to different practical situations may have been provided elsewhere in this disclosure.

An embodiment of a system generally may include electronic circuitry (for example, a computer processor) at least governing an operation of the embodiment and controlled by instructions stored in a memory, to perform specific data collection/processing and calculation steps as disclosed above. The memory may be random access memory (RAM), read-only memory (ROM), flash memory or any other memory, or combination thereof, suitable for storing control software or other instructions and data. Those skilled in the art should would readily appreciate that instructions or programs defining the operation of the present embodiment(s) may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement a method of the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The invention as recited in claims appended to this disclosure is intended to be assessed in light of the disclosure as a whole. Various changes in the details, steps and components that have been described may be made by those skilled in the art within the principles and scope of the invention.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as being limited to the disclosed embodiment(s).

Figure 1B:
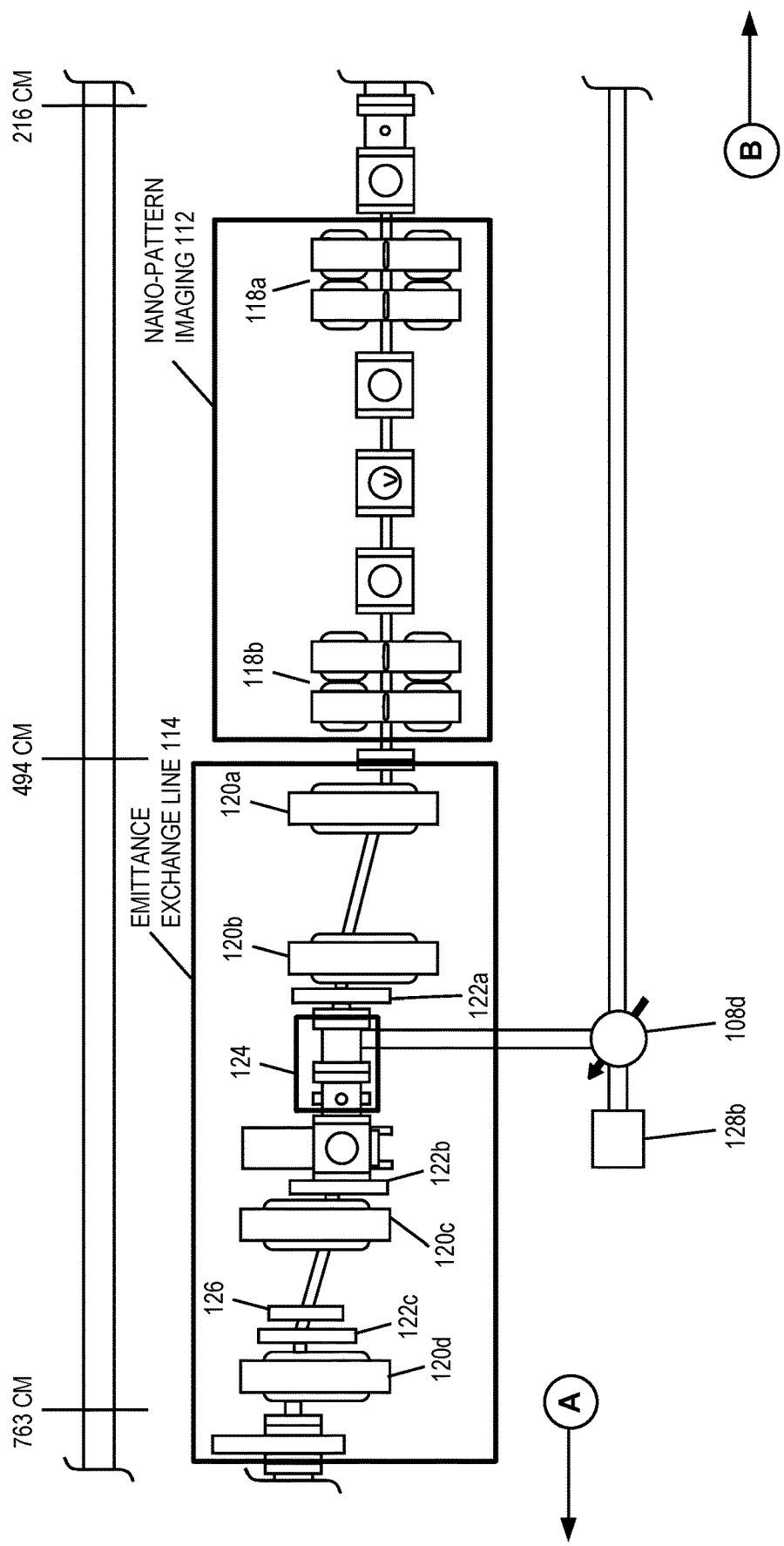
Figure 1C:
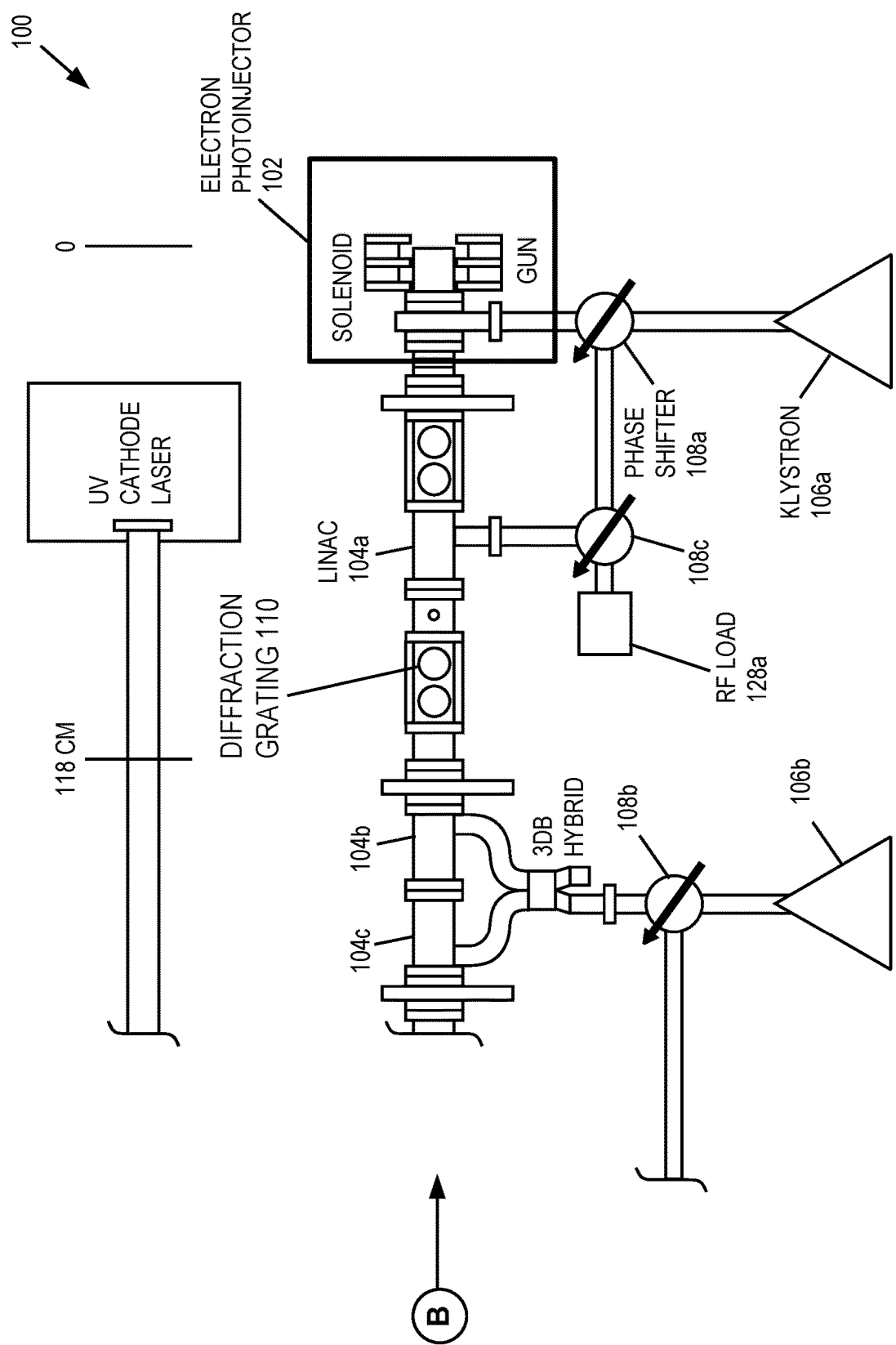

FIGS. 1A-1C are schematic diagrams illustrating a light source 100 (e.g., a free-electron laser) in accordance with some embodiments. Note that, for brevity, only the most pertinent aspects of light source 100 are discussed in detail below.

In some embodiments, light source 100 produces x-rays. In some embodiments, light source 100 produces hard x-rays (e.g., x-rays having energies above 1 keV). In some embodiments, light source 100 produces soft x-rays or extreme ultraviolet light. In some embodiments, as described below, the light (e.g., x-rays) produced by light source 100 is fully spatially- and temporally-coherent (e.g. light source 100 produces light with coherence properties similar to those of conventional lasers used for generating light in optical, ultraviolet, infrared, and other wavelengths). In some embodiments, light source 100 generates light by interacting a relativistic electron beam with an electromagnetic field (e.g., either from a UV laser, in the case of inverse Compton scattering, as described below, or from an undulator). Note, however, that for embodiments in which an undulator is used, coherent light can be generated from light source 100 using a much shorter undulator than conventional FELs (e.g., 10 meters as opposed to 100 meters). Thus, light source 100 is sometimes referred to as a compact x-ray free-electron laser (CXFEL).

Starting with FIG. 1C, an electron bunch is generated and initially accelerated using an electron photoinjector 102. For example, in some embodiments, a 4 MeV beam (e.g., electron bunch, note that the terms beam and bunch are used synonymously through the present disclosure) is generated by a 4.5 cell x-band photoinjector, which comprises a solenoid and an RF gun. The photoinjector is followed (e.g., downstream) by one or more linear accelerator (LINAC) sections (LINAC sections 104a-104c, respectively), powered by one or more klystrons (klystrons 106a-106b). For example, in some embodiments, three 35 cm long LINAC sections 104a-106c accelerate the beam to 35 MeV.

Note that, as shown, RF power from a single klystron 106 may be applied to several different components (e.g., klystron 106b powers both LINAC section 104b and LINAC section 104c as well as RF deflector cavity and accelerator cavity 124, whereas klystron 106a powers both the initial acceleration of the electron bunch and LINAC 105c). Further, a phase shift may be applied by phase shifters 108 (e.g., phase shifters 108a-108d) to the power supplied by the various klystrons 106 to the various components. RF loads 128 (e.g., RF loads 128a-128b) are included and positioned where necessary for load balancing and control.

In some embodiments, a diffraction grating 110 (e.g., diffraction crystal, such as the silicon gratings described below) is located between two of the LINAC sections (or, at least, after a first LINAC section). For example, in some embodiments, the diffraction grating 110 is located between LINAC section 104a and LINAC section 104b. The diffraction grating 110 is arranged in a transmission geometry with respect to the path of the electron bunch (e.g., the direction of propagation of the electron bunch). In some embodiments, the diffraction grating 110 diffracts the electron beam at a tunable energy with a maximum of 12 MeV.

Referring now to FIGS. 1A-1B, light source 100 includes a variety of electron optics for patterning and shaping the electron bunch downstream of the LINAC sections 104. The electron optics of light source 100 includes three main sections: a nano-pattern imaging section 112, an emittance exchange (EEX) section 114, and an inverse Compton scattering (ICS) interaction section 116. Note, however, that in some embodiments, the ICS interaction section 116 is replaced with an undulator (e.g., an undulator less than 20 m in length).

The nano-patterning imaging section 112 is downstream of LINAC section 104c and, in some embodiments, comprises two quadrupole triplets 118 (e.g., quadrupole triplet 118a and quadrupole triplet 118b) forming a telescope system.

In some embodiments, the diffraction grating 110 produces a diffraction pattern transverse to the direction of propagation of the electron bunch and the emittance exchange section 114 transforms (e.g., swaps) the diffraction pattern into a direction parallel to the direction of propagation of the electron bunch. To that end, the EEX section 114 comprises four bend magnets 120a-120d, an RF deflector cavity and accelerator cavity (collectively 124) that are independently phased and powered, along with sextupoles magnets 122a-122-c and octopole magnets 126 for aberration correction.

After EEX section 114, the ICS interaction section 116 starts with a focusing triplet 130 that reduces the beam size at the ICS interaction point 132 (e.g., to approximately a micron) before colliding the electron beam with ICS laser field from an inverse Compton scattering laser 138 (e.g., light from the inverse Compton scattering laser 138 is piped in and redirected to be nearly parallel with the electron beam at the ICS interaction point 132). The collision of the electron beam with the ICS laser field produces x-rays (or other light) 136. Downstream the ICS interaction point 132, two dipoles 134a-134b respectively bend the beam into a beam dump (e.g., by 30 degrees horizontally and 90 degrees, respectively, into a vertical beam dump). In some embodiments, the collision of the electron beam with the ICS laser field is within a magnet field of dipole magnet 134a. ICS interaction section 116 is an example of a light-generating apparatus. An undulator (not shown) is another example of a light-generating apparatus.

Figure 2A:
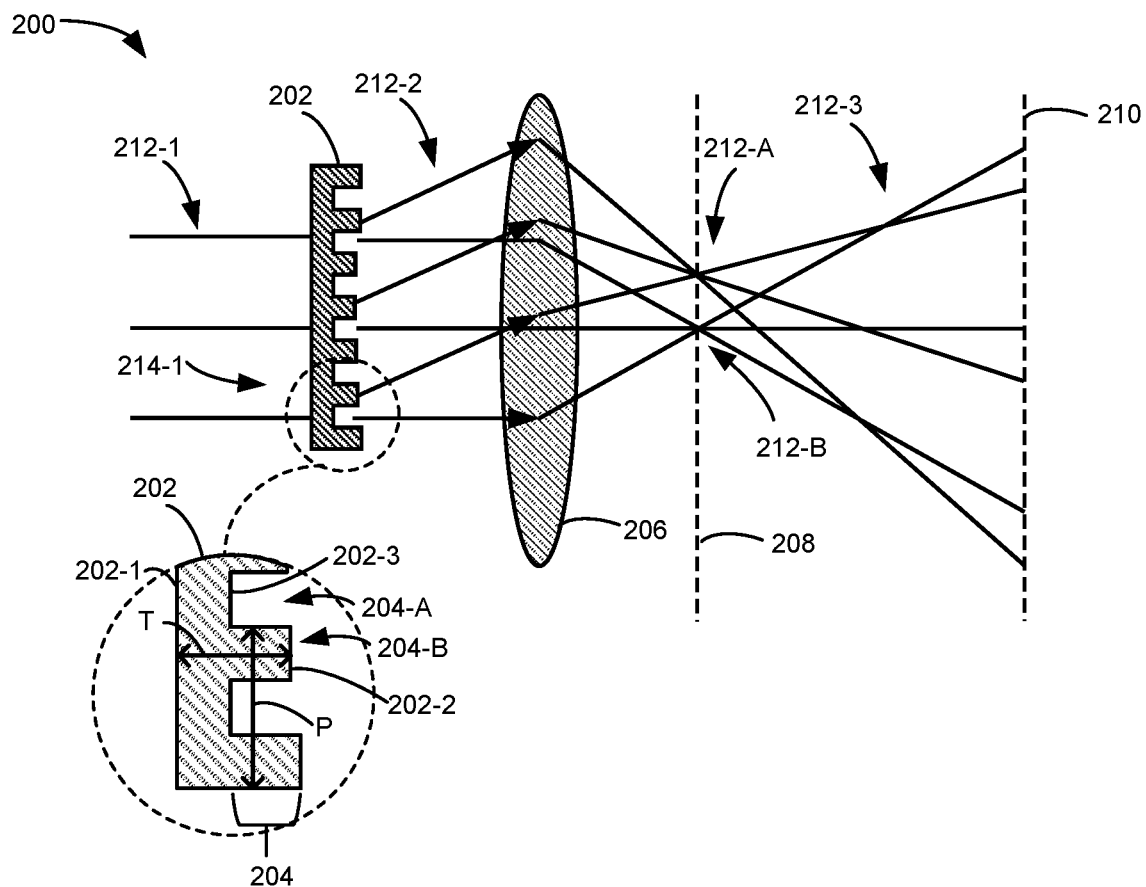
FIGS. 2A-2B are schematic illustrations of partitioning an electron bunch by electron diffraction in accordance with some embodiments.
Figure 2B:
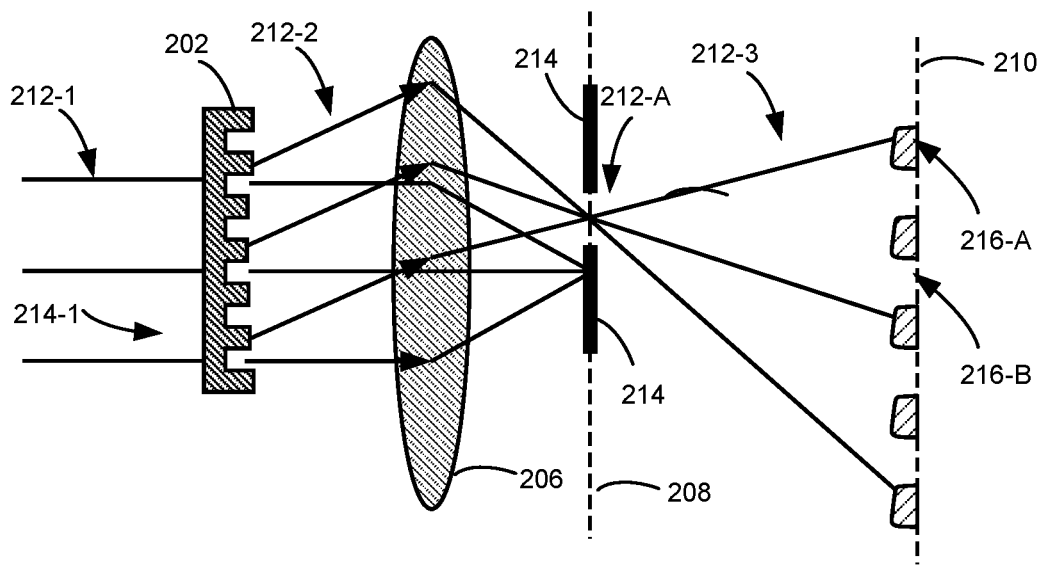

FIGS. 2A-2B are schematic illustrations of partitioning an electron bunch by electron diffraction in accordance with some embodiments. FIG. 2A illustrates a cross-sectional view of an assembly 200 including a grating 202 and a focusing magnet 206. Grating 202 is made of a single crystal silicon membrane (e.g., "UberFlat" silicon membrane provided by Norcada). For example, grating 202 is made of a silicon membrane having [100] crystal structure. As shown in the inset of FIG. 2A, grating 202 includes a nano-scaled pattern 204 that defines alternating longitudinal narrow and wide portions (e.g., alternating narrow portions 204-A and wide portions 204-B). In some embodiments, grating 202 has a thickness T defined between a surface of wide portion 204-B (e.g., surface 202-2) and an opposing surface 202-1 of grating 202. In some embodiments, thickness T is ranging from 50 nm to 1000 nm, from 50 nm to 500 nm, from 50 nm to 400 nm, from 50 nm to 300 nm, from 50 nm to 200 nm, or from 50 nm to 100 nm. In some embodiments, grating 202 has thickness T ranging from 100 nm to 300 nm. In some embodiments, thickness T is 200 nm. Grating 202 has an area defined by edges ranging from 50 micrometer to 500 micrometer (e.g., grating 202 has a rectangular or square shape). In some embodiments, grating 202 has an area corresponding to 50 micrometer×50 micrometer, 100 micrometer×100 micrometer, or 200 micrometer×200 micrometer.

Nano-scaled patterning 204 is located at a center of silicon membrane of grating 202. Nano-scaled patterning 204 includes a plurality of longitudinal grooves or valleys cut (e.g., etched) through a portion of the silicon membrane of grating 202 defining alternating narrow portions 204-A and wide portions 204-B. Wide portions 204-B have thickness T, as described above, between surface 202-1 and surface 202-2. Thickness T is greater than a thickness of narrow portions 204-A between surface 202-1 and surface 202-3. In some embodiments, the grooves are aligned with an edge of silicon membrane forming grating 202 and thereby the grooves are aligned with a crystal plane of the silicon membrane. In some embodiments, nanoscale patterning 204 has an area defined by edges ranging from 20 micrometer to 100 micrometer. In some embodiments, nano-scaled patterning 204 covers an area on the silicon membrane corresponding to 20 micrometer×20 micrometer, 50 micrometer×50 micrometer, or 100 micrometer×100 micrometer. Nanoscale patterning 204 has a pitch P corresponding to a sum of widths of wide portion 204-B and narrow portion 204-A, as shown in the inset of FIG. 2A. In some embodiments, pitch P is less than or equal to 600 nm, less than or equal to 500 nm, less than or equal to 200 nm, less than or equal to 300 nm, or less than or equal to 200 nm. In some embodiments, pitch P is 400 nm corresponding to a sum of a width of wide portion 204-B (e.g., 200 nm) and a width of narrow portion 204-A (e.g., 200 nm). The pitch (i.e., periodicity of grating 202) of grating 202 defines an x-ray wavelength of a generated x-ray light pulse so that the electrons then emit coherently at that wavelength.

In some embodiments, grating 202 is supported by a supporting mesh (not shown) such that grating 202 is positioned at a center of the supporting mesh. For example, the supporting mesh is polygon chip having a diameter less or equal to 3 mm.

In FIG. 2A, grating 202 is configured to receive an electron bunch 212-1 accelerated to a relativistic energy (e.g., at least several MeV) propagating in a direction substantially perpendicular to a reference plane defined by surface 202-1 of grating 202 and surfaces 202-2 of wide portions 204-2 of nano-scaled patterning 204. In some embodiments, grating 202 is tilted with respect to the direction of propagation in a vertical and/or horizontal direction (e.g., forming a pitch and/or a yaw angle). Electron bunch 212-1 includes a uniform distribution of relativistic (e.g. MeV) electrons. Grating 202 transmits and diffracts electron bunch 212-1 as a patterned electron bunch 212-2. Patterned electron bunch 212-2 is redirected by focusing magnet 206 such that patterned electron bunch 212-2 is directed to distinct Bragg spots (e.g., Bragg spots 212-A, 212-B and 212-C) on a focal plane 208. A Bragg spot on focal plane 208 corresponds to crystallographic peak of a particular Bragg diffraction. A desired partitioning of electron bunch 212-1 to a diffraction pattern (e.g., patterned electron bunch 212-2) is created by diffraction of the relativistic electrons in a transmission geometry through grating 202. The diffraction pattern of electron bunch 212-2 is controlled by Bragg diffraction from the crystal planes of the silicon membrane (e.g., [100] crystal planes of the silicon membrane). While the diffraction pattern is controlled by the Bragg diffraction, nano-scaled pattern 204 spatially controls a fraction of the electrons diffracted into a particular Bragg spot (e.g., Bragg spots 212-A and 212-B on focal plane 208). Therefore, an electron bunch directed onto Bragg spot 212-A has one or more distinct electronic characteristics from electronic characteristics of an electron bunch directed to Bragg spot 212-B. In some embodiments, the electronic characteristics include a spot size. The electronic characteristics of the electron bunch correlate to optical characteristics of an x-ray light pulse generated from the electron bunch. In some embodiments, the optical characteristics includes a bandwidth of the x-ray light pulse.

For example, a first portion of electron bunch 212-1 is directed, while passing through grating 202 and focusing magnet 206, onto Bragg spot 212-A. At the Bragg spot 212-A, the first portion of electron bunch 212-1 has a first spot size and an x-ray light pulse subsequently generated from the first portion of electron bunch 212-1 has a first bandwidth. A second portion of electron bunch 212-1 is directed, while passing through grating 202 and focusing magnet 206, to Bragg spot 212-B. At the Bragg spot 212-B, the second portion of electron bunch 212-1 has a second spot size an x-ray light pulse subsequently generated from the second portion of electron bunch 212-1 has a second bandwidth. In some embodiments, the second spot size is distinct from the first spot size and the second bandwidth is distinct from the first bandwidth.

In FIG. 2A, patterned electron bunch 212-2 is received on image plane 212 such that patterned electron bunch 212-2 projects a bright field image of grating 202. The bright field image reproduces input electron bunch 212-1 on image plane 210 (e.g., the bright field image on image plane 210 has a uniform distribution of the MeV electrons similar to that of electron bunch 212-1). In contrast to FIG. 2A, FIG. 2B illustrates a dark field image including alternating bright 216-A and dark areas 216-B across image plane 210. The dark field image is created by selecting only a single Bragg spot of patterned electron pattern 210-2 to be transmitted onto image plane 210. The selection is done by positioning an aperture 214 on focal plane 208. Aperture 214 is configured to block all but a single Bragg diffraction peak. As shown in FIG. 2B, aperture 214 allows the electron bunch at Bragg spot 212-A to propagate onto image plane 210 while other electron bunches (e.g., the electron bunch at Bragg spot 212-B) are blocked.

At a unity magnification, transversely patterned electron bunches have a same spatial periodicity as the silicon structure. The spatial periodicity may, however, be continuously adjusted over a wide range of periodicity by demagnifying/magnifying the pattern (e.g., by a factor of up to 100) using magnetic lenses (e.g., focusing magnet 206) to scale the pattern into an x-ray range.

The disclosed partitioning (e.g., patterning) method of an electron bunch determines the x-ray phase fronts, which are deterministically controlled by nano-scaled patterning 204 of grating 202. The disclosed method is applicable for controlling and stabilizing the x-ray beam properties, eventually yielding full control of the phase through different nano-scaled patterns on the silicon membrane. In some embodiments, by changing the electron spot size on grating 202, different numbers of grating periods are illuminated thus producing different numbers of patterned electron bunches. This will control both the x-ray pulse length and its bandwidth, given by the reciprocal of the number of grating periods illuminated. Because of a high contrast ratio in the electron pattern, the x-ray output pulse is expected to be nearly transform limited.

To produce XFEL radiation two further steps are required, first the electrons must be accelerated to their final energy and the pattern swapped from transverse space to temporal space using a technique called emittance exchange (EEX). Then the electrons must propagate through either a short static magnetic undulator or equivalently scatter an infrared (IR) laser pulse to produce coherent x-rays. For the purpose of x-ray emission, the primary difference between using an undulator and an IR laser is the period of the oscillation. The short period of the IR laser allows electrons of a few tens of MeV to produce hard x-rays, rather than the GeV required for an undulator, dramatically shrinking the size and cost of the accelerator compared to undulator-based XFELs. The tradeoff to using an IR laser is that the lower energy electron beam produces fewer photons and has tighter beam quality requirements.

FIGS. 3A and 3B are exemplary illustrations of experimental results for controlling intensities of different Bragg spots by varying an incident angle of an input electron bunch. FIG. 3 illustrates a dark field image of a nanopatterned electron bunch partitioned by an unpatterned single-crystal silicon membrane of 200 nm thickness. The experiments were carried out at SLAC National Accelerator Laboratory's Ultrafast Electron Diffraction (UED) facility using an RF photoinjector to produce femtosecond electron bunches at a few MeV energy. The electron bunch was operated at a repetition rate of 180 Hz and a kinetic energy of 2.26 MeV with a relative bunch energy spread, rms $7.5 \times 10^{-4}$. The bunch has a normalized emittance of approximately 3 nm-rad after collimator, a minimum 5 gm spot size at the sample and rms bunch length of 110 fs. Various combinations of bunch charge (10 fC, 20 fC, 60 fC, 1 pC) and collimator size (200 gm, 500 gm) have been tested during the diffraction experiment.

The solid-state sample chamber at UED laboratory held a sample stage with 6-axis motion control, i.e., translation in the x-, y- and z-directions, ±30° rotation along the x- and y-axes (pitch and yaw), ±1° rotation along z-axis. The planar Si membrane devices were mounted perpendicular to the bunch and the orientation of the silicon crystal plane were mechanically aligned with the x- and y-rotation axes to within 1°. After aligning the crystal planes of the membrane to within 1° of the x- and y-rotation axes of the sample holder, angle scans were carried out in an area that had been simulated and found to simultaneously maximize the ($2\bar{2}0$) electron bunch and extinguish the (000) electron bunch. To perfectly align the crystal normal to the electron bunch, a 2D pitch/yaw rotation scan was performed to find the normal point where the intensity of Bragg spots are equalized. Pitch and yaw settings at normal point were then set to be the references for all further images. The crystal was then rotated by certain pitch and yaw angle based on previous multi-slice simulations to find the two-electron bunch condition where up to 80% forward electron bunch was diffracted into one Bragg spot. The detector used for image collection and processing was an Andor IXon Ultra 888 EMCCD. For the diffraction images collected in making FIGS. 3A-3B, the gain was 150 and the exposure was 0.1 s. The CCD background and dark current were subtracted off taking the average of multiple background images with the UV laser off and the RF to pulse. Furthermore, a constant background was subtracted from each diffraction image. The centers of all visible diffraction peaks were set at the local maxima and all counts within 25 pixels of the center were summed over for the respective reflection. These were then normalized by using the total counts in all the visible diffraction peaks.

The electron bunch energy was calculated using a 45 mm aperture in the scintillator screen to calculate the pixel size of the image. The calibration of the image detector is 36 micron per pixel. The spacing between the (440) and ($\bar{4}\bar{4}0$) spots were 822.12 pixels, corresponding to 29.60 mm. Using the distance from the sample to the scintillator screen (3124 mm), the Bragg angle was calculated, and in turn, the kinetic energy could be calculated as the crystal lattice spacing was already known for the silicon (100) used in the membrane.

A thickness (e.g., thickness T) of silicon membrane is about half a dynamical extinction distance in order to extinguish the direct electron bunch. The required thickness for given diffraction conditions, electron bunch divergence and electron bunch energy was estimated based on dynamical calculations, which included an imaginary part for the scattering potential to account for inelastic scattering.

The crystal planes of the silicon membrane were aligned to a sample holder in order to control the incident angle of the input electron bunch. The angle was then scanned over a range of incident angles by turning the sample holder in order to simultaneously maximize the ($2\bar{2}0$) electron bunch and extinguish the (000) electron bunch. The angle was scanned in a vertical direction (yaw angle) and/or in a lateral direction (pitch angle) perpendicular to the direction of propagation of the electrons.

FIGS. 3A and 3B compare two distinct diffraction patterns. In FIG. 3A the direct electron bunch (000) is maximized at a yaw angle of −2.19 mrad, and in FIG. 3B the (220) reflection is maximized at a yaw angle of −1.15 mrad. In FIG. 3A, approximately 80% transmission of the electron bunch was scattering into (000) Bragg spot at the indicated pitch/yaw angles. In FIG. 3B, approximately 80% of the electron bunch was scattered into (220) Bragg spot at the indicated pitch/yaw angles. The percentage was calculated relative to the incident electron bunch. In FIG. 3B, the (000) Bragg spot is reduced to about 5% of the incident intensity with the remaining few percent scattering into other peaks. To image distinct Bragg diffraction peaks requires the electron bunch divergence angle at the membrane to be significantly smaller than the first-order Bragg angle of 1.2 mrad at 2.26 MeV. In addition, the relative energy spread must be low enough that chromatic aberration in the focusing system does not cause the peaks to overlap. These requirements on divergence and energy spread are met by the photoinjector electron bunch as shown in FIG. 3B. A lifetime of the silicon membrane will eventually be set by radiation damage effects. Radiation damage effects may be studied using high-voltage electron microscopy. Using the appropriate cross-sections for the "knock-on" ballistic atomic displacement process in silicon and realistic electron bunch current density of 0.1 A/m$^2$ (1 pC at 1 kHz repetition rate into a 100 micron diameter spot) a time of 277 days exposure operating 24/7 to accumulate 1% atomic displacements was estimated. The exemplary experimental results described herein with respect to FIGS. 3A and 3B demonstrate sufficiently achievable photoinjector operations, stability, and electron bunch quality for using generating and using the nanopatterned electron bunches, as described with respect to FIGS. 2A and 2B.

Figure 4A:
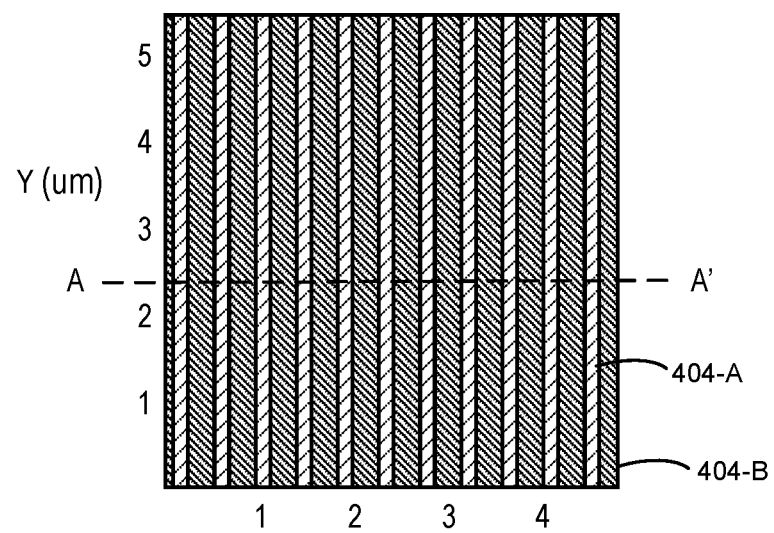
FIGS. 4A-4C are exemplary illustrations of an experimental bright-field image of an electron bunch patterned by diffraction at a silicon grating.
Figure 4B:
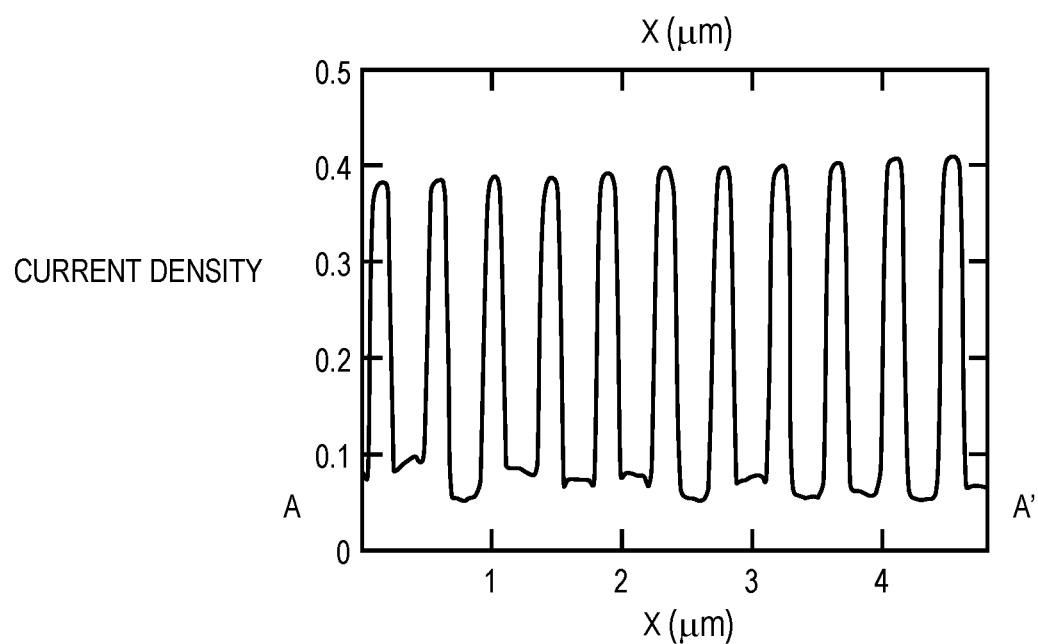
Figure 4C:
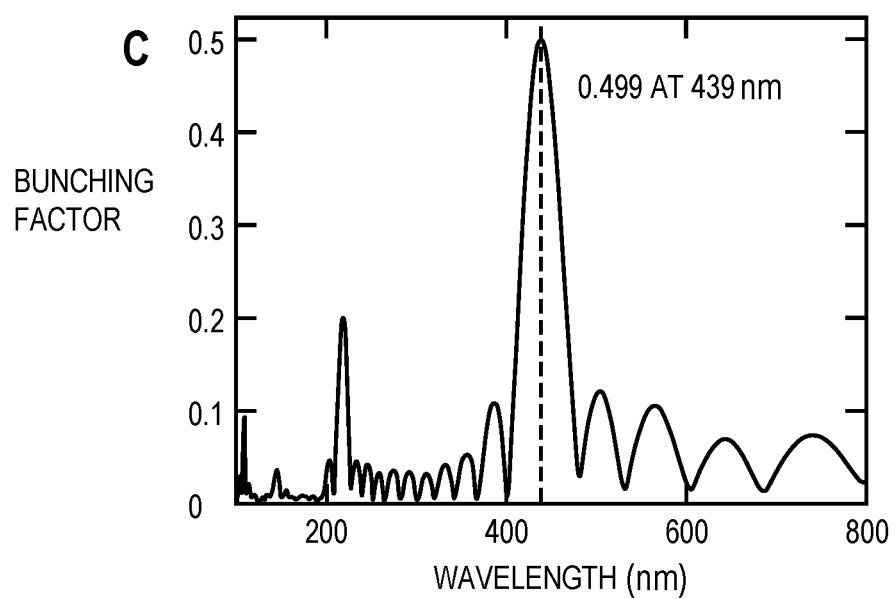

FIGS. 4A-4C illustrate experimental results from an experiment performed with a nano-scaled single-crystal silicon grating (e.g., grating 202 in FIG. 2A) of 200 nm thickness (e.g., thickness T in FIG. 2A) and a 200 nm pitch (e.g., pitch P corresponding to a sum of a 200 nm width of narrow portion 204-A and a 200 nm width of wide portion 204-B of grating 202). FIG. 4A is an exemplary illustration of an experimental bright-field image of an electron bunch patterned by diffraction at the silicon grating. At an orientation maximizing the ($2\bar{2}0$) Bragg spot (e.g., as described with respect to FIG. 3B), an aperture (e.g., aperture 214 described with respect to FIG. 2B) was introduced to block all but the electron bunch at the ($2\bar{2}0$) Bragg spot, producing the bright field image shown in FIG. 4A. Bright portions 404-A correspond to narrow portions 204-A of nano-scaled patterning 204 of grating 202 and dark portions 404-B correspond to wide portions 204-B of nano-scaled pattering 204 of grating 020. Bright portions 404-A (e.g., bright areas) have a higher density of electrons than dark portions 404-B (e.g., dark areas). FIG. 4B illustrates a cross-sectional view of the bright-field image of FIG. 4A along reference line AA'. Approximately 80% of the electron bunch that passes through the wide portions of the grating is deflected out of the zero-order spot, thereby producing a strong 4:1 contrast ratio in the image plane (e.g., image plane 210 in FIG. 2B) when other spots are blocked by the aperture, as demonstrated by FIG. 4B. FIG. 4C illustrates an amplitude of a Fourier transform of the distribution shown in FIG. 4B known as a FEL bunching factor. The Fourier transform has a peak value near 0.5, similar to a maximum bunching factor seen after FEL saturation. FIG. 4C also shows significant harmonic content that may be exploited to reach even higher photon energies than the fundamental. The Fourier transformed peak being within a few percent of a transform limit demonstrates applicability of this method for producing fully coherent bunching. The properties of the Fourier transformed peak in FIG. 4C are transferred, following an emittance exchange, to a time-frequency domain so that the Fourier transformed properties correlate to optical characteristics of generated x-ray pulses.

Figure 5:
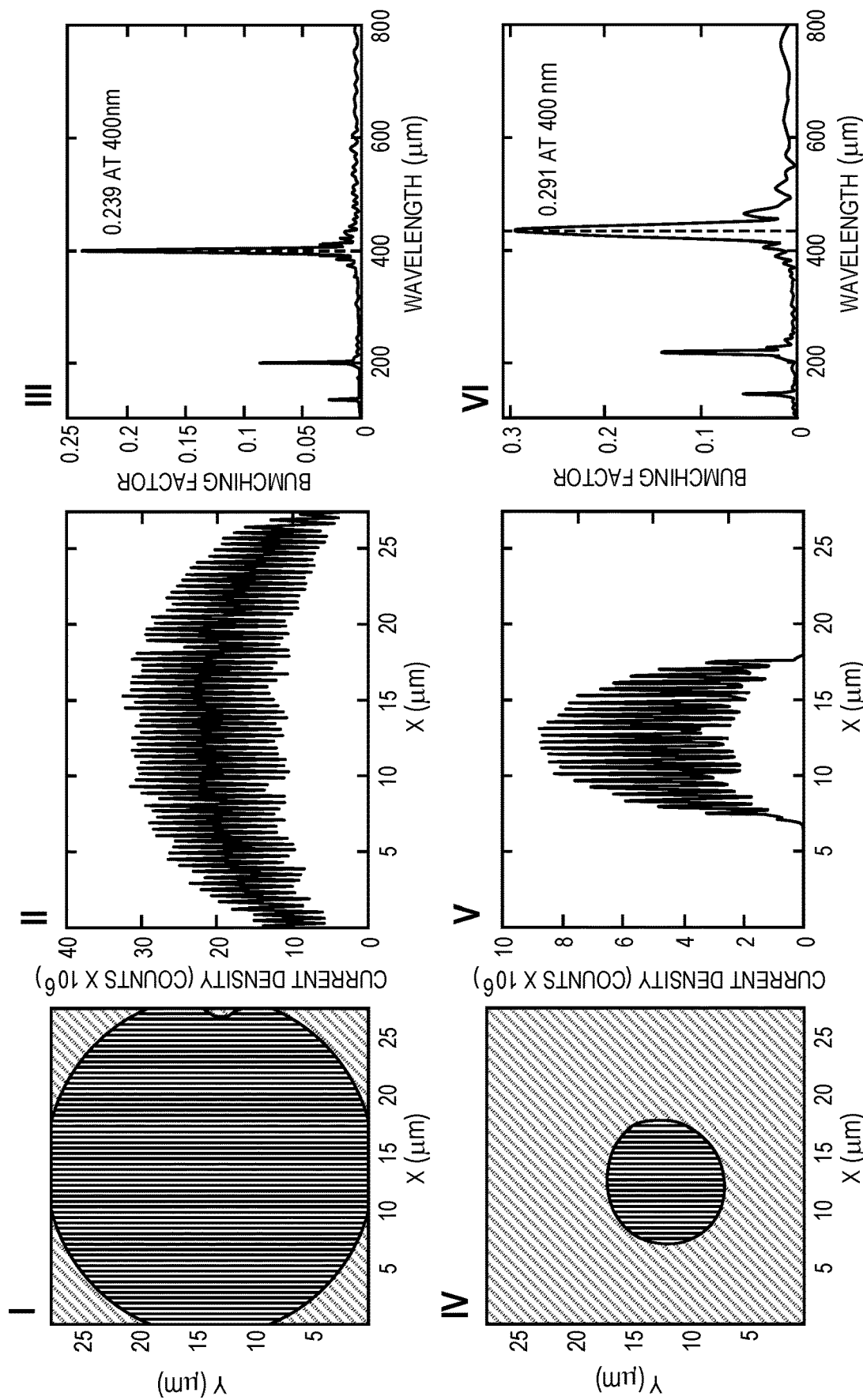
FIG. 5 is an exemplary illustration of experimental results demonstrating properties of a partitioned electron bunch arising from distinct electron bunch spot sizes at a silicon grating.

FIG. 5 is an exemplary illustration of experimental results demonstrating properties of a partitioned electron bunch arising from distinct electron bunch spot sizes at a silicon grating. Panel I illustrates a bright-field image of a first spot having a first spot size at a nanopatterned grating (e.g., grating 202). Panel II illustrates a cross-sectional view of the bright-field image of Panel I and Panel III illustrates an amplitude of a Fourier transform of the distribution shown in Panel II. Similarly, Panel IV illustrates a bright-field image of a second spot having a second spot size at the nanopatterned grating. Panel II illustrates a cross-sectional view of the bright-field image of Panel I and Panel III illustrates an amplitude of a Fourier transform of the distribution shown in Panel II. As shown, the first electron bunch spot size is greater than the second electron bunch spot size in that the first electron bunch spot size illuminates more grating periods than the second electron bunch spot size. By alternating the electron bunch spot size, the bandwidth of the partitioned electron bunch is altered. A greater spot size results in a narrower bandwidth. As shown, the Fourier transform peak of the bright-field image arising from the first electron bunch spot having the first spot (greater) spot size has a narrower bandwidth than the Fourier transform peak of the bright-field image arising from the second electron bunch spot having the second spot size (smaller).

The pulse length of the x-ray light pulses is determined by a number of nanopatterned electron bunches. For the images shown in FIG. 5, demagnification by quadrupole lenses and implementation of emittance exchange (which provides another factor of 6 demagnification) the pulses would be approximately 69 and 25 periods long for the first electron bunch spot size (Panels I-III) and for the first electron bunch spot size (Panels I-III) respectively. The 69 and 25 periods correspond to pulse length of 0.1 fs and 0.3 fs at a wavelength of 1.24 nm, respectively.

FIGS. 6A-6D collectively provide a flow chart of a method 600 for generating nanopatterned electron bunches, in which optional blocks are indicated with dashed boxes, in accordance with some embodiments of the present disclosure.

Figure 6A:
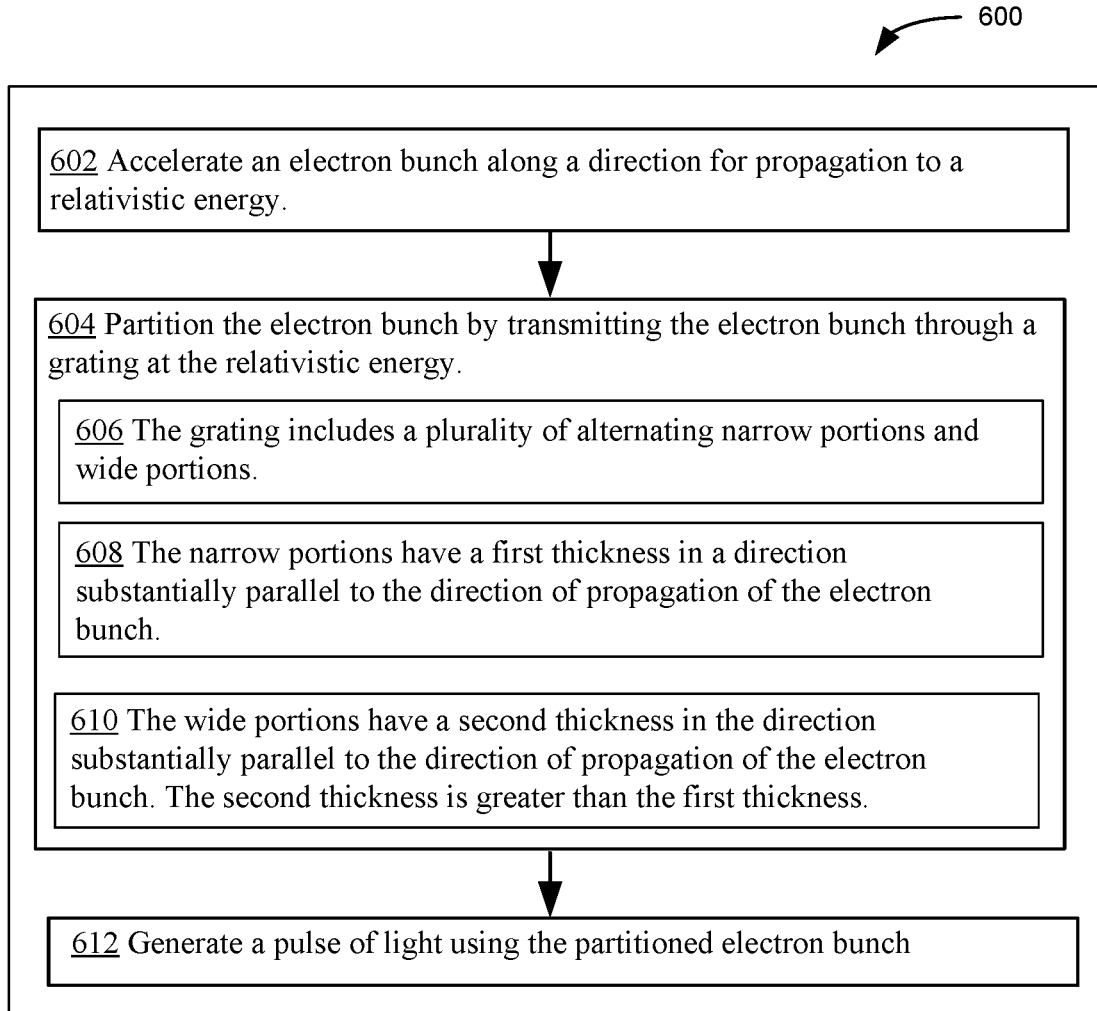

Block 602 in FIG. 6A. Method 600 includes accelerating an electron bunch along a direction of propagation to a relativistic energy. For example, in FIGS. 1A-1C, a first linear accelerator section 104a accelerates, to relativistic energies, an electron bunch produced by electron photoinjector 102.

Block 604 in FIG. 6A. Method 600 also includes partitioning (e.g., patterning) the electron bunch by transmitting the electron bunch through a grating at the relativistic energy. The grating includes a plurality of alternating narrow portions and wide portions (block 606). The narrow portions have a first thickness in a direction substantially parallel to the direction of propagation of the electron bunch (block 608). The wide portions have a second thickness in the direction substantially parallel to the direction of propagation of the electron bunch. The second thickness is greater than the first thickness (block 610). For example, grating 202 in FIG. 2A receives and transmits electron bunch 212-1 which has been accelerated along the direction of propagation. Grating 202 is made of a single crystal silicon membrane and includes a nano-scaled pattern 204 with alternating longitudinal wide portions 204-B and narrow portions 204-A. While transmitting, grating 202 diffracts (e.g., redirects) electron bunch 212-1 as a patterned electron bunch 212-2 including a plurality of sub-bunches (e.g., nanobunches) so that the diffraction pattern is controlled by Bragg diffractions from the crystal planes of the silicon membrane of grating 402 whereas the nano-scaled pattern 204 spatially controls a fraction of the electron bunch diffracted into a particular Bragg spots (e.g., Bragg spot 212-A or 212-B on focal plane 208 of focusing magnet 206).

Block 612 in FIG. 6A. Method 600 also includes generating a pulse of light using the partitioned electron bunch. FIG. 1A-1C illustrate an example in which a pulse of light (e.g., x-rays) is generated by interacting the partitioned electron bunch with light from an inverse Compton scattering (ICS) laser, such as a UV laser.

Block 614 in FIG. 6B. The alternating narrow portions and wide portions of the grating (e.g., narrow portions 204-A and wide portions 204-B of grating 202 in FIG. 1A) are patterned such that the pulse of light is chirped (e.g., the frequency of the light changes across the pulse of light).

Block 616 in FIG. 6B. Transmitting the electron bunch through the grating at the relativistic energy diffracts the electron bunch off a crystal structure of the grating, thereby creating a diffraction pattern having a plurality of crystallographic peaks. For example, patterned electron bunch 212-2 has a diffraction pattern having crystallographic peaks at Bragg spots 212-A and 212-B at focal plane 208 in FIG. 2A. The plurality of crystallographic peaks are spatially separated because of the plurality of alternating narrow portions and wide portions (e.g., narrow portions 204-A and wide portions 204-B).

Block 618 in FIG. 6B. Method 600 includes selecting, using an aperture, electrons in a respective crystallographic peak of the plurality of crystallographic peaks to use as the partitioned electron bunch and discard the remaining electrons (e.g., that are not part of the respective crystallographic peak). For example, in FIG. 2B aperture 214 is positioned on focal plane 208 such that an electron bunch diffracted onto Bragg spot 212-A is transmitted while all other electron bunches (e.g., electron bunch diffracted onto Bragg spot 212-B) are blocked.

Block 620 in FIG. 6B. Transmitting the electron bunch through the grating at the relativistic energy partitions the electron bunch in a direction substantially transverse (e.g., substantially perpendicular) to the direction of propagation of the electron bunch. For example, in FIG. 2A electron bunch 212-1 propagating in a longitudinal (e.g., horizontal) direction is partitioned to distinct Bragg spots (e.g., Bragg spots 212-A and 212-B) along (vertical) focal plane 208 which is substantially transverse to the direction of propagation of electron bunch 212-1.

Block 622 in FIG. 6B. The pulse of light is generated with the electron bunch partitioned in a direction substantially parallel to the direction of propagation of the electron bunch (e.g., bunch 212-A in FIG. 2B, e.g., as produced or transformed by emittance exchange section 114, FIG. 1).

Block 624 in FIG. 6B. Prior to generating the pulse of light using the partitioned electron bunch, perform an emittance exchange on the partitioned electron bunch (e.g., to swap or transform the partitioning in the transverse direction for partitioning in the longitudinal direction, see emittance exchange section 114, FIG. 1).

Block 626 in FIG. 6C. The electron bunch is a first electron bunch having first electronic characteristics and the pulse of light is a first pulse of light having first optical characteristics. For example, as shown in FIG. 5 an electron bunch having first electronic characteristics (e.g., the electron bunch images in Panel I) is used for generating a first pulse of light having first optical characteristics (e.g., as demonstrated by the Fourier transform peak in Panel III).

Block 628 in FIG. 6C. Method 600 includes accelerating a second electron bunch having second electronic characteristics different from the first electronic characteristics. For example, the second electron bunch imaged in Panel IV of FIG. 5 has different characteristics than the first electron bunch imaged in Panel I of FIG. 5. Method 600 also includes partitioning the second electron bunch by transmitting the second electron bunch through the grating and generating a second pulse of light using the partitioned second electron bunch. The second pulse of light has second optical characteristics different from the first optical characteristics. For example, the Fourier transform peak in Panel VI has different optical characteristics than the Fourier transform peak in Panel III.

Block 630 in FIG. 6C. The first electronic characteristics include a first spot size and the second electronic characteristics include a second spot size different from the first spot size (e.g., Panels I and IV in FIG. 5).

Block 632 in FIG. 6C. The first optical characteristics include a first bandwidth and the second optical characteristics include a second bandwidth different from the first bandwidth (e.g., Panels III and VI in FIG. 5).

Block 634 in FIG. 6D. Generating the pulse of light using the partitioning electron bunch comprises scattering the partitioned electron bunch off of light from a laser (e.g., performing inverse Compton scattering, as shown in FIG. 1C).

Block 636 in FIG. 6D. Generating the pulse of light using the partitioned electron bunch comprises subjecting the partitioned electron bunch to an undulator (e.g., transmitting the partitioned electron bunch through an undulator).

Block 638 in FIG. 6D. The pulse of light is within 10% of a transform limit.

Block 640 in FIG. 6D. The pulse of light is longitudinally coherent across a plurality of wavelengths of the pulse of light. For example, the longitudinally partitioned electron bunch comprises a plurality of sub-bunches (e.g., sub-bunches at Bragg spots 212-A and 212-B in FIG. 2A), and light produced from a first sub-bunch of the plurality of sub-bunches is longitudinally (temporally) coherent with light produced from a second sub-bunch of the plurality of sub-bunches that is different from the first sub-bunch.

Block 642 in FIG. 6D. The pulse of light is generated at a first light source that includes the grating (e.g., light source 100, FIGS. 1A-1C).

Block 644 in FIG. 6D. Use the pulse of light to seed a second light source, distinct from the first light source, to produce coherent light (e.g., a second, higher power, free-electron laser, not shown).

Block 646 in FIG. 6D. The pulse of light comprises x-rays.

The methods and features described above with respect to the flow charts in FIGS. 6A-6D provide for nanopatterned electron bunches (e.g., electron beams) with temporal coherence. The methods also provide for deterministic phase control of x-ray free-electron lasers. Diffraction from the silicon grating allows for precision tailoring of the electron bunch pattern that eventually drives the x-ray phase.

The tailoring performed in the transverse space, and through a low aberration emittance exchange line, is transferred to the longitudinal dimension resulting in phase-controlled x-ray output pulses. Relative slippage of one x-ray wavelength per undulator period occurs between x-rays and electrons during emission, limiting the ability to perform instantaneous phase shifts. Nevertheless, the method provides novel ways for manipulating the x-ray characteristics including coherently controlling frequency, bandwidth, polarization, pulse length and/or amplitude of x-ray pulses. The method will thus provide tunable coherent femtosecond photon beams with unmatched phase control. In addition, the electron bunch patterning method allows nearly any desired time structure to be imposed on the electron bunch by a mask in the electron bunch created by semiconductor lithography. As the distance across the mask corresponding to, via emittance exchange, time delay on an attosecond scale, it becomes possible to generate an initial time=0 pulse for x-ray pump, x-ray probe experiments with near-zero jitter, and to produce chirped beams at will, with full temporal coherence and deterministic pulse profiles, unlike the amplified noise on which the SASE mode is based.

The ability to produce large (~10 eV) bandwidth light pulses and application of chirped pulse compression enables hard x-ray pulses with attosecond duration. This will allow probing of the first step of the chemical reactions, i.e., electronic rearrangements and charge migration, which in turn trigger the motion of nuclei and produce changes in the molecular skeleton. Attosecond x-ray pulses may be used to address many open questions on a role of electronic correlations and electron-nuclear couplings in an initial phase of photochemical reactions. Such studies are key to understanding the basic steps of life-giving processes such as photosynthesis, vision, and catalysis, both for industrial chemical production and for the enzymes which control human biochemistry.

The methods of the present disclosure provide for the generation of phase-locked multi-color x-ray packets with precisely tunable attosecond to femtosecond delays for ground-breaking investigations of coherent charge and energy transfer dynamics in molecules and materials using techniques such as non-linear four-wave-mixing or stimulated x-ray Raman scattering. In contrast to its infrared and visible analogs, multi-dimensional x-ray spectroscopy offers tremendous promise due to its ability to provide elemental specificity. Therefore, multi-dimensional x-ray spectroscopy may enable studies of charge flow between specific atoms of a catalyst, or coherent energy transfer between chromophores in photosynthesis. The approach involves an application of multiple x-ray pulses, each tuned to an absorption edge of a particular atomic species inside a chemical system. By varying time-delays and frequencies of x-ray pulses multi-dimensional absorption maps that shed light on the pathways for redistribution of charge and energy may be obtained.

A compact source mechanism using inverse-Compton scattering based on these methods can also provide a coherent seed to large XFELs. The seed must have a power significantly greater than that from the SASE startup noise of ~10 kW and high stability from shot to shot, which is much less than our calculated peak power of a few MW. Such a seed would then transfer deterministic phase properties to a higher power beam of a large XFEL.

The current methods and assemblies have broad interdisciplinary applications for nanoscience, biology and chemistry. Examples include single and multi-color spectroscopy with extreme temporal coherence (spanning many molecules), patterned phase-coherent time and energy structures for both spectroscopy and diffraction experiments (such as time-resolved Laue diffraction for molecular movies, microdiffraction using Laue lenses, and fast coherent diffractive imaging of samples as large as a cell) and sample-induced superluminance.

Embodiments of the present invention also disclose methods for providing temporally coherent x-ray pulses based on diffraction intensity maps from a single crystal silicon membrane. As explained above, conventional XFELs provide only partial temporal coherence. Coherence may be achieved by a compact x-ray free electron laser (CXFEL) using a pre-bunched beam (e.g., a pre-bunched electron bunch) with inverse Compton scattering (ICS), as described above. The pre-bunching can be produced by passing a transverse spatial modulation through an emittance exchange (EEX) beamline with aberration correction optics to facilitate the exchange for emittance differences of four orders of magnitude. In some embodiments, the source of modulation is a single crystal silicon membrane. In some embodiments, the single crystal silicon membrane includes a nanoscaled patterning (e.g., grating 202 with nanoscaled patterning 204 in FIG. 2A).

To create a dynamical beam block that maximizes a contrast of a spatial pattern at many beam energies, one must consider more than a kinematic regime for electron diffraction, where one beam receives a majority of the intensity. There is an advantage to using a direct beam in the final spatial modulation. Thus, along certain parts of the silicon crystal membrane, the direct beam will need to be extinguished. At a relatively high energy for electron diffraction of a photoinjector, multiple Bragg reflections in the diffraction pattern will be excited, diminishing applicability of a two-beam approximation and bolstering the need for simulations to determine optimal crystallographic orientation for a given membrane thickness and beam energy. Therefore, there is a need for dynamical multiple beam approach such as the diffraction intensity mapping provided by the present disclosure.

A scattering across a depth of a crystal (e.g., a single crystal silicon membrane) can be calculated, including multiple scattering events of single electrons, based on simulation of experimental diffraction patterns. In some embodiments, a multislice method is used to simulate experimental diffraction patterns.

The multislice method includes using Schrodinger's equation iteratively and dividing the crystal's potential into multiple layers along the electron's direction of travel, the electron wavefunction $\psi_n(x,y)$ can be calculated at the exit of the crystal. For the n+1$^{th}$ layer, the wavefunction is $$\psi_{n+1}(x,y) = p_n(x,y) * [t_n(x,y) \cdot \psi_n(x,y)], \quad (1)$$

where $p_n(x,y)$ is the Fresnel propagator, $t_n(x,y)$ is the transmission function, and * is the 2-dimensional convolution. In the physical optics interpretation, the propagator accounts for near-field diffraction while the transmission function describes a phase grating.

A less computationally intensive form of Equation 1 can be had by applying the Fast Fourier Transform in conjunction with the convolution theorem. The electron wavefunction is then given by $$\psi_{n+1}(x,y) = \mathcal{F}^{-2}\{P_n(k_x,k_y) \cdot \mathcal{F}[t_n(x,y) \cdot \psi_n(x,y)]\}, \quad (2)$$

where $P_n(k_x, k_y)$ is the Fourier transform of the real-space propagator, while $\mathcal{F}$ and $\mathcal{F}^{-1}$ are the Fourier and inverse Fourier transforms, respectively. The real-space propagator (in the approximation of up to a 1° tilt) is $$P_n(k_x,k_y) = \exp[-i\pi\lambda\Delta z + 2\pi i \Delta z \alpha(k_x,k_y,\theta_x,\theta_y)], \quad (3)$$

where $\alpha(k_x, k_y, \theta_x, \theta_y) = k_x \tan\theta_x + k_y \tan\theta_y$, $k_x$ and $k_y$ are the x and y components of the wavenumber, $\theta_x$ and $\theta_x$ are the x and y components of the sample tilt, and $\Delta z$ is the slice thickness.

Further, the transmission function is given by $$t(x,y,\Delta z) = \exp[i\sigma V(x,y)\Delta z], \quad (4)$$

where $\sigma$ is the relativistic electron interaction constant given by $$\sigma = \frac{2\gamma m_0 |e| \lambda}{4\pi\hbar^2},$$

with $m_0$ the electron rest mass, $\gamma$ the Lorentz factor, e the electron charge, $\lambda$ the relativistic electron wavelength, and $\hbar$ the reduced Planck constant.

In Equation (4), $V(x,y)$ is the crystal potential projected along the beam direction z that describes the potential within a distance $\Delta z$ of the current layer; we approximate this as a sum of all the individual atomic potentials in the layer, which we can be treated as Fourier coefficients. These are proportional to the electron scattering factor and are weighted by a Debye-Waller temperature factor B according the expression $\exp[-Bs_{\vec{g}}^2]$, where $$s_{\vec{g}} = \frac{\sin\theta}{\lambda},$$

where $\theta$ is the Bragg angle of the $\vec{g}$ diffraction spot, and $\lambda$ is the relativistic electron wavelength. The temperature factor causes increased attenuation of high-angle scattering with increasing temperature. As for the calculation, there exist many parametrizations that allow the electron scattering factor and the Debye-Waller factor to be calculated for various elements and temperatures.

To account for angular divergence in the incoming beam, we first consider an electron plane wave with wavefunction $\psi(\vec{x},\vec{k}_i) = \exp[2\pi\vec{k}_i \cdot \vec{x}]$, where $\vec{k}_i$ is the deflection in the reciprocal space of the crystal relative to beam normal. Assuming no interference between the discrete angles in the simulation, we can incoherently sum over the angles and apply a weighting function $p(\vec{k}_i)$, to get the total intensity:

$$I(\vec{x}) = \frac{1}{N} \sum_i p(\vec{k}_i) \left| \psi_t(\vec{x},\vec{k}_i) \right|^2, \quad (5)$$

where $\psi_t(\vec{x},\vec{k}_{(i)})$ is the transmitted wavefunction at exit from the crystal and N is the number of angles included in the sum. As the beam has a Gaussian profile, the corresponding weighting function $p(\vec{k}_i)$ will be used.

Figure 7:
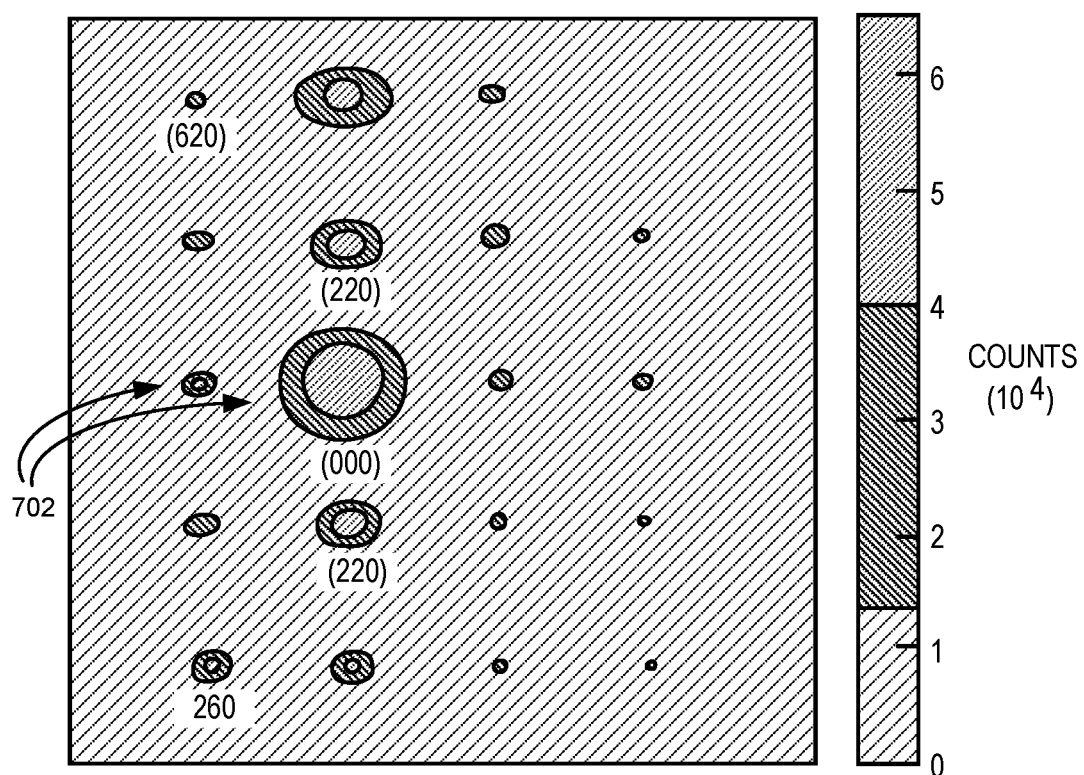
FIG. 7 is an exemplary illustration of experimental results for diffracting an electron bunch off a silicon crystal.

FIG. 7 is an exemplary illustration of experimental results for diffracting an electron bunch off a silicon crystal. FIG. 7 illustrates a dark field image of a nanopatterned electron bunch partitioned by a single-crystal silicon membrane of 200 nm thickness, similar to the experimental results described with respect to FIGS. 3A and 3B. FIG. 7 illustrates a (100) crystallographic diffraction pattern of a silicon membrane on a scintillator for 2.26 MeV electrons. The image shows intensity peaks corresponding to 20 Bragg reflections 702 in the diffraction pattern. Bragg reflections 702 of high interest include reflection ($\bar{6}20$), reflection ($\bar{2}20$), reflection (000), reflection ($2\bar{2}0$), and reflection ($2\bar{6}0$), as annotated in FIG. 7.

The single-crystal membrane was positioned to a holder and scanned over a range of pitch and/or yaw angles. To minimize the post-processing required to determine the orientation of the pitch and yaw axes of the sample holder relative to the crystal plane of the membrane, the sample was positioned to the holder with less than 1° of roll. Such a value could be corrected in situ. A kinetic energy of 2.26 MeV was used. As for the setup, a collimator was located 0.56 m downstream of the RF gun—a 90.7 µm collimator was inserted for this experiment, giving a charge of 10.3 fC per shot. A secondary solenoid at 1.0 m focused the beam onto the 6-axis sample holder located at approximately 1.36 m from the gun. Beyond the holder, there is a 3.12 m drift to a yttrium aluminium garnet (YAG) screen, which is imaged using the detector (e.g., Andor iXon Ultra 888 EMCCD). The pixel size was calculated to be 36 µm in real space and 0.00179 Å$^{-1}$ in reciprocal space. Fitting the beam with-out the sample, the RMS reciprocal space width $\sigma_k$ was 0.0133 Å$^{-1}$, which corresponds to an RMS angle $\sigma_{x'}$, of 61 µrad.

An angle between a normal of the silicon crystal structure and electron beam was determined by first tilting the sample, with the sample holder, until the diffraction pattern had symmetric intensities. Then an intensity map was taken for a small set of tilts surrounding the proposed normal. Symmetry in the intensity map was used to determine the beam normal. The sample was then rastered through pitch and yaw settings of the holder that matched the collection of wavenumber $(K_x, K_y)$ values of interest and a diffraction pattern was imaged.

Figure 8:
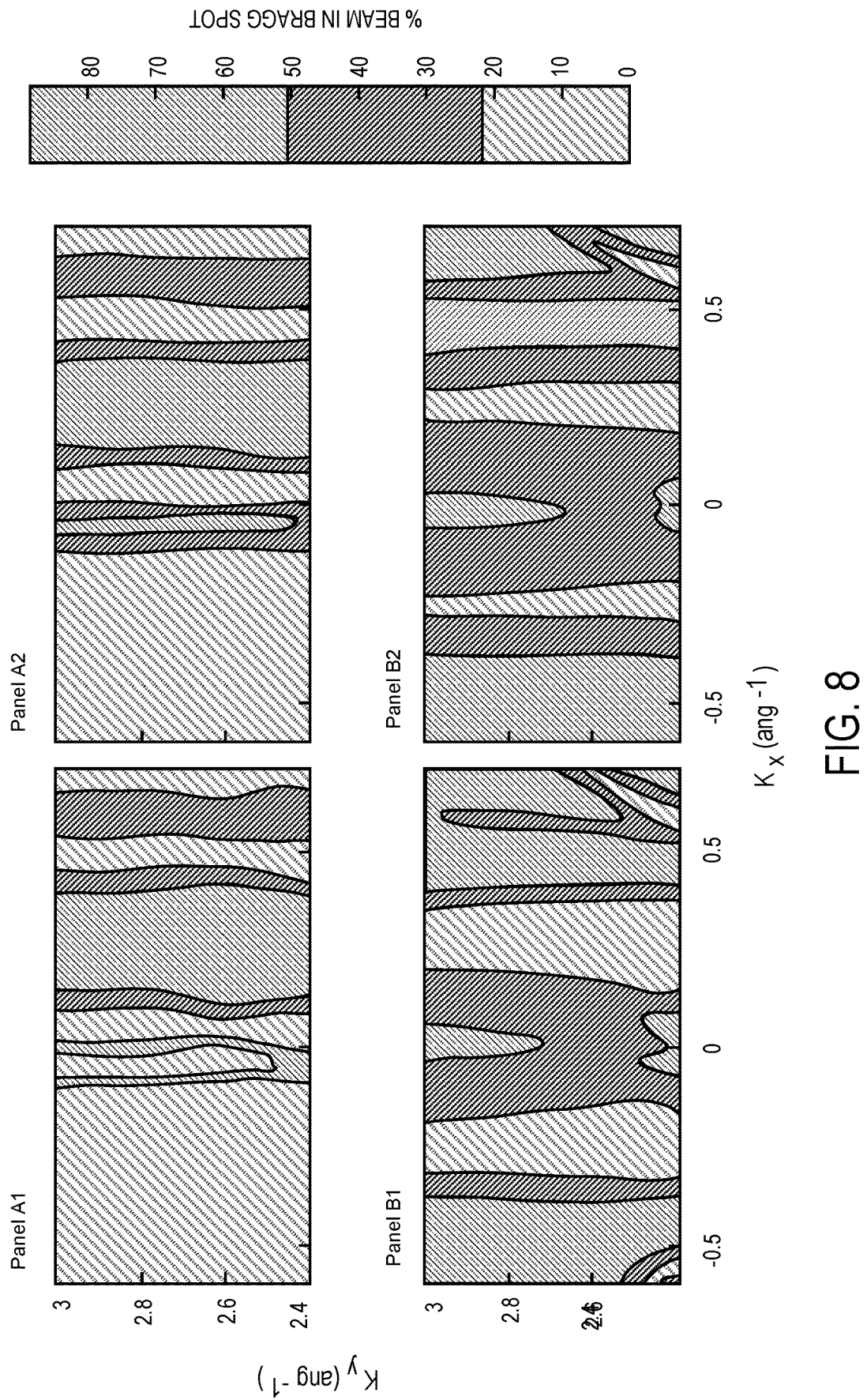
FIG. 8 is an exemplary illustration of experimental and simulated intensity maps of Bragg reflections.

FIG. 8 is an exemplary illustration of experimental and simulated intensity maps of Bragg reflections. Panel A1 illustrates a simulated intensity map of a Bragg reflection of ($2\bar{2}0$) crystal plane, Panel A2 illustrates an experimental intensity map of the Bragg reflection of ($2\bar{2}0$) crystal plane, Panel B1 illustrates a simulated intensity map of a Bragg reflection of (000) crystal plane, and Panel B2 illustrates an experimental intensity map of the Bragg reflection of (000) crystal plane. The percentages represented on the intensity bar refer to a fraction of elastic scattering. The intensity maps of FIG. 8 illustrate separation of an elastically scattered component of the original electron bunch from the inelastic component. An estimated absorption of the 200 nm silicon (100) crystal is at 2.26 MeV.

The simulated intensity maps were obtained using the multislice simulation method describe above with respect to Equations 1-5. The experimental intensity maps were obtained using a method similar to that described with respect to FIG. 7 by imaging a diffraction pattern of an electron bunch diffracted by a 8-by-8 unit cells of (100) silicon crystal structure. The 8-by-8 unit cells were necessary for obtaining a reciprocal space resolution. For obtaining a real space resolution to properly simulate the projected potential of the increased number of unit cells required a 512×512 grid. The simulated maps in Panels A1 and B1 were normalized to the Bragg 20 reflections visible in the diffraction pattern (e.g., as shown in FIG. 7). The $k_x$ and $k_y$ axes (see, e.g., Equation 2) are rotated 135 degrees relative to the (100) plane of the crystal as the crystal planes of the membrane were rotated relative to the pitch and yaw planes of the holder. For both of the Bragg reflections ($2\bar{2}0$) and (100), the maxima of the simulated values are greater, with the simulated (000) reflection having a maximum of 89% and the experimental reflection 83%. The simulated patterns also show more detail than the experimental patterns. For instance, the two valleys that start near the bottom of $k_x$=-0.5, -0.5 are less pronounced in the experimental data. This can be explained by the clipping of the ($\bar{6}20$) and ($2\bar{6}0$) reflections by a lens of the detector used for collecting the experimental images. Each reflection has its respective value where it receives a majority of the intensity. The clipping causes the contribution to the (000) reflection to appear inflated and the valleys to be shallower. Of note is the elastically scattered minimum of 3.5% for the (000) beam, which in the context of a patterned membrane would allow for significant contrast. As will be explained below, a contrast in the (000) beam versus one of the higher order reflections is desirable.

Figure 9:
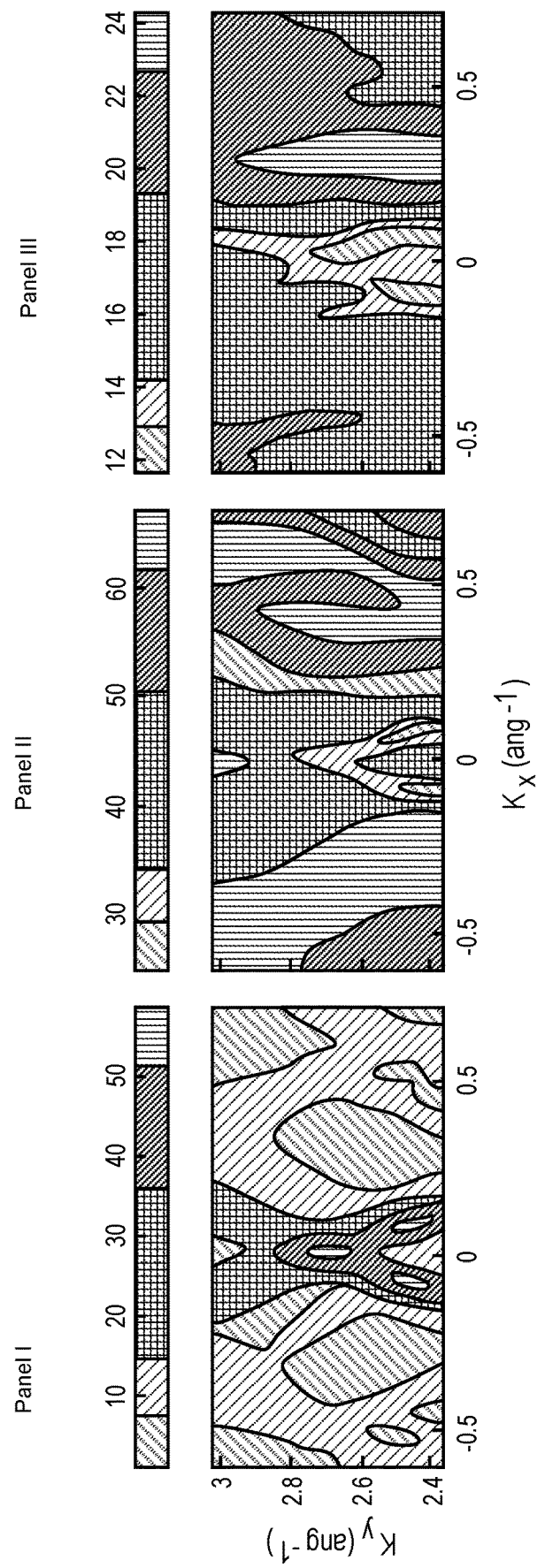
FIG. 9 is an exemplary illustration of experimental and simulated intensity maps demonstrating percentage of scattered electrons at various angles.

FIG. 9 is an exemplary illustration of experimental and simulated intensity maps demonstrating percentage of scattered electrons at various angles. Panel I illustrates simulated elastic scattering intensity for higher order Bragg reflections (excluding the 20 Bragg reflections shown in FIG. 7), Panel II illustrates experimental elastic scattering intensity measured for the 20 Bragg reflections of FIG. 7 as a percentage of initial charge and Panel III illustrates experimental inelastic scattering intensity measured for the 20 Bragg reflections as a percentage of the initial charge.

In Panel II of FIG. 9, a maximum of 67% of the initial electron pulse is elastically scattered. Based on the simulated high order elastic scattering in Panel I of FIG. 9, a variation in the measured intensity in Panel II can be attributed to elastic scattering into higher-order reflections. Examining the total charge in the image to calculate the inelastic scattering (Panel III of FIG. 9), a similar pattern to the elastic scattering with a valley in the center is observed. Diffraction into higher-order reflections is expected being consistent with plasmon diffuse scattering. In such scattering, incident electrons excite valence electrons in the material, causing the incident electron to lose energy and thus scatter. Such scattering is anisotropic, centering about bright Bragg peaks as the sample is tilted with the Bragg reflection having a Lorentzian distribution and half angle of $\theta_E=\Delta E/2E$ where is the energy loss and E is the beam kinetic energy. The energy loss is equal to the plasmon energy, which for silicon is 16.7 eV. At 2.26 MeV, this gives a half angle of 3.7 μrad. Examining FIG. 9, there is a tail as one would expect when comparing a Gaussian to something with the expected Lorentzian component. FIG. 9 also confirms that the plasmon diffuse scattering shifts to the brightest reflection as both the diffracted (000) and ($2\bar{2}0$) reflections have similar tails.

In order to maintain the Gaussian profile of the beam and minimize the contrast reduction, the results in FIG. 9 favor reducing a thickness of the diffracting material. At the energies and nanometer-scale thickness that are being examined, the electron bunch experiences little diffraction and therefore the beam used in the final patterning should be the direct (000) reflection. Thus, bright field imaging should be used. Furthermore, to limit the plasmon diffuse scattering near the imaging electron bunch, blocking portion of the pattern should be oriented so that the excited reflection relatively far from the direct beam.

Figure 10:
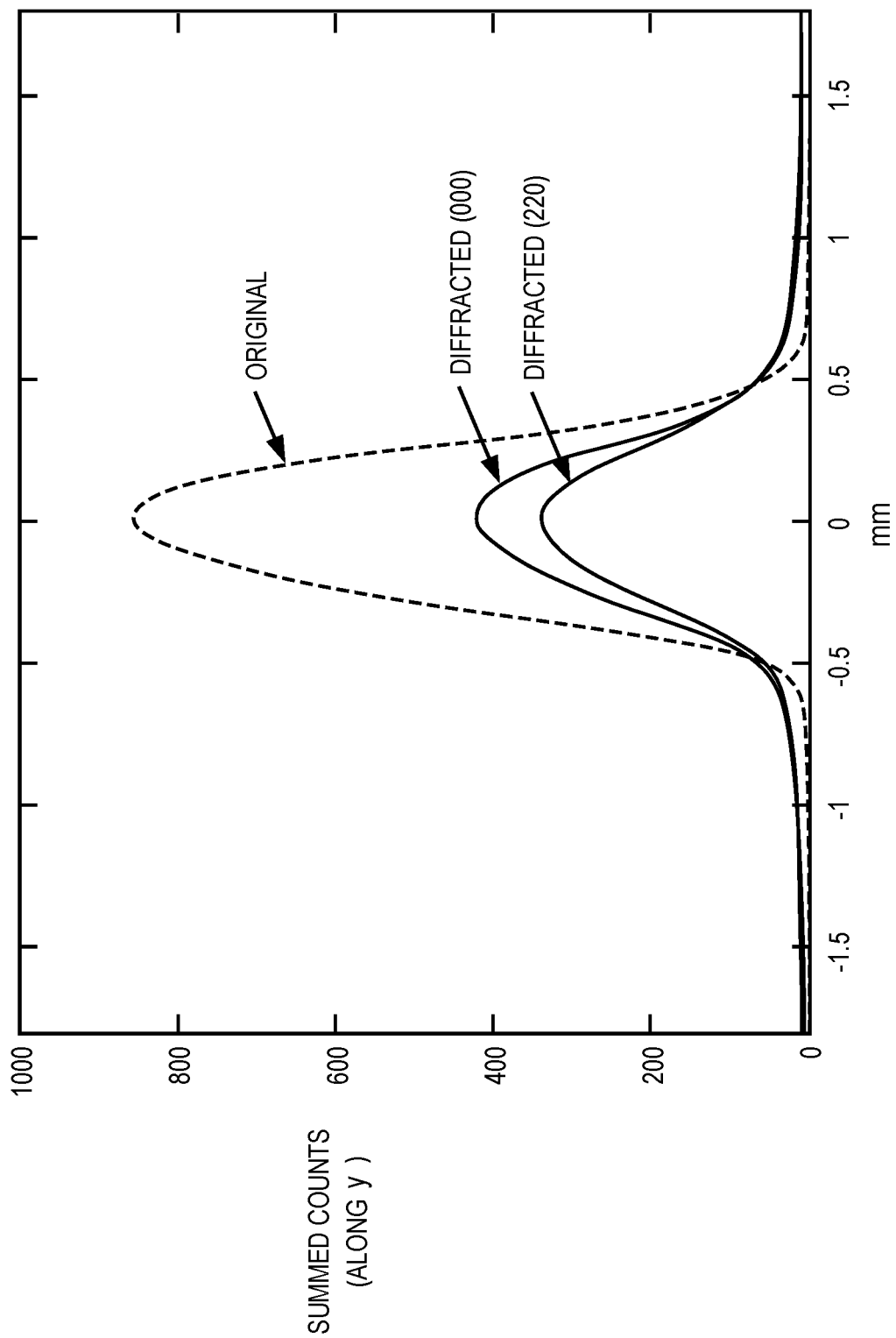
FIG. 10 is an exemplary illustration of an experimental absorption an electron beam before and after diffraction.

FIG. 10 is an exemplary illustration of an experimental absorption an electron beam before and after diffraction. FIG. 10 illustrates absorption spectra measured before diffraction (labelled as "Original"), and after diffraction at the (000) diffraction plane and at the ($2\bar{2}0$) diffraction plane. The local background was removed for all absorption spectra. The image of the original beam was taken with a gain of 75 and exposure of 0.102 s, the image of diffraction patterns was taken with a gain of 150 and an exposure of 0.102 s, though the gain differences have been compensated.

To estimate the absorption occurring in the crystal, an imaginary term is added to the projected potential of the crystal. This gives rise to an exponentially decaying damping term on the intensity $$e^{-\frac{t}{\lambda}}$$

where the mean tree path is given by $$\lambda = \frac{(hc)^2 K_{0_z}}{4\pi m_e c^2 eV_0'} \quad (6)$$

In Equation 6, $K_{0_z}$ is the z component of the wave vector, which for high energy electrons is approximately the electron wavelength $\lambda_e$. $V_0'$ is the imaginary part of the potential and is in unit of Volts. The imaginary portion of the atomic potential has been calculated using Hartree-Fock-Slater (HFS) atomic functions to be 100 keV (see, e.g., G. Radi, Acta Crystallographica Section A 26, 41 (1970)). These can be scaled to the energy used in the experiment, yielding a mean free path of 3.57 μm, which gives an absorption of 5.5% at 200 nm. Together, the elastic and in-elastically scattered components account for about 88% of the original beam. The remaining approximate 12% of the beam is being absorbed by the crystal, going into inelastic processes that are outside the measured area of the image, or were subtracted during the background removal procedure.

To summarize, a correspondence between the elastic scattering obtained experimentally and by simulations was found. The fraction of inelastic and elastic scattering as a percentage of the charge in the electron packet was found to be respectively 67% and at least 21% with the remaining percentage being some combination of absorption and inelastic processes. From this, it can be determined that the spatial modulation should be formed from the bright field image and that the thickness of the dynamical beam block used to form this image should be minimized. The produced image will then serve as input into an EEX beamline to provide the pre-bunching needed to convert an inverse Compton scattering light source into a CXFEL.

Figure 11A:
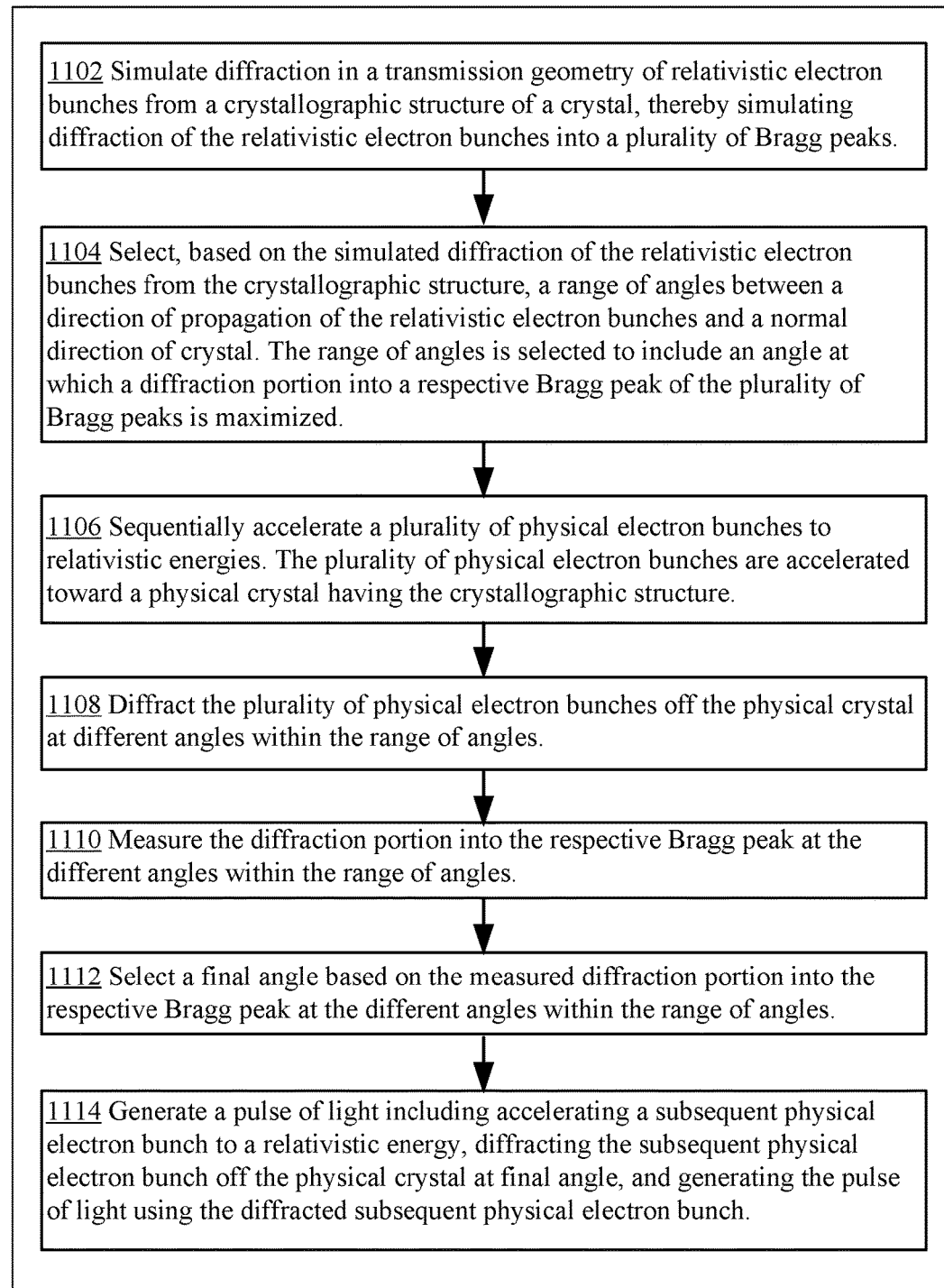

FIGS. 11A-11C collectively provide a flow chart of a method 1100 for providing temporally coherent x-ray pulses based on diffraction intensity maps from a single crystal silicon membrane, in which optional blocks are indicated with dashed boxes, in accordance with some embodiments of the present disclosure.

Block 1102 in FIG. 11A. Method 1100 includes simulating diffraction in a transmission geometry of relativistic electron bunches from a crystallographic structure of a crystal, thereby simulating diffraction of the relativistic electron bunches into a plurality of Bragg peaks. In some embodiments, the simulating is done by multislicing simulation methods described with respect to Equations 1-5.

Block 1104 in FIG. 11A. Method 1100 includes selecting, based on the simulated diffraction of the relativistic electron bunches from the crystallographic structure, a range of angles between a direction of propagation of the relativistic electron bunches and a normal direction of crystal. The range of angles is selected to include an angle at which a diffraction portion into a respective Bragg peak of the plurality of Bragg peaks is maximized.

Block 1106 in FIG. 11A. Method 1100 includes sequentially accelerating a plurality of physical electron bunches to relativistic energies (e.g., using LINAC sections 104, FIG. 1C). The plurality of physical electron bunches are accelerated toward a physical crystal having the crystallographic structure (e.g., grating 202 in FIG. 2A). In some embodiments, the physical crystal having the crystallographic structure is a single crystal silicon membrane.

Block 1108 in FIG. 11A. Method 1100 includes diffracting the plurality of physical electron bunches off the physical crystal at different angles within the range of angles. For example, a grating (e.g., grating 202 excluding nanoscaled patterning 204 in FIG. 2A) is scanned over a range of pitch and/or yaw angles while being exposed to an electron beam (e.g., electron bunch 212-1 in FIG. 2A). In some embodiments, the scanning includes turning a sample holder that the grating is being attached to.

Block 1110 in FIG. 11A. Method 1100 includes measuring the diffraction portion into the respective Bragg peak at the different angles within the range of angles. In some embodiments, measuring the diffraction portion into the respective Bragg peak at different angles involves generating an intensity map of Bragg reflection (e.g., intensity maps illustrated in Panels A2 and B2 of FIG. 8 for Bragg reflections at crystal planes ($2\bar{2}0$) and (000), respectively).

Block 1112 in FIG. 11A. Method 1100 includes selecting a final angle based on the measured diffraction portion into the respective Bragg peak at the different angles within the range of angles (e.g., a final angle is selected based on an intensity of the respective Bragg peak at the final angle).

Block 1114 in FIG. 11A. Method 1100 includes generating a pulse of light including accelerating a subsequent physical electron bunch to a relativistic energy, diffracting the subsequent physical electron bunch off the physical crystal at final angle, and generating the pulse of light using the diffracted subsequent physical electron bunch. For example, the electron photoinjector 102 (FIG. 1C) can be tuned to provide electron bunches with different characteristics to the diffraction grating 110.

Block 1116 in FIG. 11B. Diffracting the subsequent physical electron bunch off the physical crystal at the final angle partitions the subsequent physical electron bunch in a direction substantially transverse to the direction of propagation of the subsequent physical electron bunch. For example, electron bunch 212-1 at grating 202 partitions the electron bunch into patterned electron bunch 212-2 in FIG. 2A. The partitioning is in a direction along focal plane 208 that is substantially transverse to the direction of propagation of electron bunch 212-1.

Block 1118 in FIG. 11B. The pulse of light is generated with the subsequent physical electron bunch partitioned in a direction substantially parallel to the direction of propagation of the subsequent physical electron bunch (e.g., a longitudinal direction). For example, as shown in FIGS. 1A-1C, the electron punch is subject to an emittance exchange section 114, which swaps the transverse partitioning for longitudinal partitioning.

Block 1120 in FIG. 11B. Prior to generating the pulse of light using the partitioned subsequent physical electron bunch, perform an emittance exchange on the partitioned subsequent physical electron bunch (e.g., to swap the partitioning in the transverse direction for partitioning in the longitudinal direction, e.g., as described above).

Block 1122 in FIG. 11B. Generating the pulse of light using the partitioned electron bunch comprises scattering the partitioned electron bunch off of light from a laser (e.g., performing inverse Compton scattering), e.g., as described above with reference to the inverse Compton scattering interaction point in FIG. 1A.

Block 1124 in FIG. 11B. Generating the pulse of light using the partitioned electron bunch comprises subjecting the partitioned electron bunch to an undulator (e.g., transmitting the partitioned electron bunch through an undulator).

Block 1126 in FIG. 11B. The pulse of light comprises x-rays.

Block 1128 in FIG. 11C. The simulation of the diffraction in the transmission geometry is performed using a multi-slice method (e.g., as described with respect to Equations 1-5).

Block 1130 in FIG. 11C. The crystal is a silicon crystal (e.g., grating 202 excluding nanoscaled patterning 204 in FIG. 2A).

Block 1132 in FIG. 11C. The crystallographic structure is a Si(100) crystallographic structure.

What is claimed is:

1. A method, comprising:
   simulating diffraction in a transmission geometry of relativistic electron bunches from a crystallographic structure of a crystal, thereby simulating diffraction of the relativistic electron bunches into a plurality of Bragg peaks;
   selecting, based on the simulated diffraction of the relativistic electron bunches from the crystallographic structure, a range of angles between a direction of propagation of the relativistic electron bunches and a normal direction of crystal, wherein the range of angles is selected to include an angle at which a diffraction portion into a respective Bragg peak of the plurality of Bragg peaks is maximized;
   sequentially accelerating a plurality of physical electron bunches to relativistic energies, wherein the plurality of physical electron bunches are accelerated toward a physical crystal having the crystallographic structure;
   diffracting the plurality of physical electron bunches off the physical crystal at different angles within the range of angles;
   measuring the diffraction portion into the respective Bragg peak at the different angles within the range of angles;
   selecting a final angle based on the measured diffraction portion into the respective Bragg peak at the different angles within the range of angles;
   generating a pulse of light, including:
     accelerating a subsequent physical electron bunch to a relativistic energy;
     diffracting the subsequent physical electron bunch off the physical crystal at final angle; and
     generating the pulse of light using the diffracted subsequent physical electron bunch.

2. The method of claim 1, wherein:
diffracting the subsequent physical electron bunch off the physical crystal at the final angle partitions the subsequent physical electron bunch in a direction substantially transverse to the direction of propagation of the subsequent physical electron bunch;
the pulse of light is generated with the subsequent physical electron bunch partitioned in a direction substantially parallel to the direction of propagation of the subsequent physical electron bunch; and
the method further includes:
prior to generating the pulse of light using the partitioned subsequent physical electron bunch, performing an emittance exchange on the partitioned subsequent physical electron bunch.

3. The method of claim 2, wherein generating the pulse of light using the partitioned electron bunch comprises scattering the partitioned electron bunch off of light from a laser.

4. The method of claim 2, wherein generating the pulse of light using the partitioned electron bunch comprises subjecting the partitioned electron bunch to an undulator.

5. The method of claim 1, wherein the simulation of the diffraction in the transmission geometry is performed using a multi-slice method.

6. The method of claim 1, wherein the crystal is a silicon crystal.

7. The method of claim 6, wherein the crystallographic structure is a Si(100) crystallographic structure.

8. The method of claim 1, wherein the pulse of light comprises x-rays.

* * * * *